US011054600B2

(12) United States Patent
Cruz et al.

(10) Patent No.: US 11,054,600 B2
(45) Date of Patent: Jul. 6, 2021

(54) FIBER OPTIC APPARATUS FOR RETROFIT FIBER OPTIC CONNECTIVITY

(71) Applicant: CORNING OPTICAL COMMUNICATIONS LLC, Charlotte, NC (US)

(72) Inventors: Sandra Irene Amaya Cruz, Reynosa (MX); Arturo Sanchez Garcia, Reynosa (MX); Brent Vaudry Linas, San Diego, CA (US); Adriana Montalvo Urbano, Reynosa (MX); Guadalupe Rodriguez Sanchez, Reynosa (MX); Fabiola Patricia Villanueva Tavares, Reynosa (MX)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 16/549,316

(22) Filed: Aug. 23, 2019

(65) Prior Publication Data
US 2019/0377144 A1 Dec. 12, 2019

Related U.S. Application Data

(62) Division of application No. 15/492,208, filed on Apr. 20, 2017, now Pat. No. 10,436,999.
(Continued)

(51) Int. Cl.
*G02B 6/44* (2006.01)
*G02B 6/38* (2006.01)

(52) U.S. Cl.
CPC ......... *G02B 6/4452* (2013.01); *G02B 6/3897* (2013.01); *G02B 6/4471* (2013.01);
(Continued)

(58) Field of Classification Search
CPC .. G02B 6/4452; G02B 6/3897; G02B 6/4471; G02B 6/4472; G02B 6/4477; G02B 6/4453
(Continued)

(56) References Cited

U.S. PATENT DOCUMENTS 6,516,128 B2  2/2003  Hwang
6,980,725 B1  12/2005  Swieconek
(Continued)

FOREIGN PATENT DOCUMENTS

EP  3032304 A1  6/2016

OTHER PUBLICATIONS

International Search Report and Written Opinion PCT/US2018/018665 dated May 24, 2018.

*Primary Examiner* — Jerry M Blevins
(74) *Attorney, Agent, or Firm* — Grant A. Gildehaus

(57) ABSTRACT

Embodiments of the disclosure are directed to a fiber optic apparatus for retrofit fiber optic connectivity. The fiber optic apparatus is configured to reduce the size and footprint of a typical fiber optic cabinet for retrofit deployment within existing copper infrastructure, while allowing a user to provide and manage fiber optic network connections between a network provider and a plurality of subscribers. In an exemplary embodiment, the fiber optic apparatus decreases width by vertically aligning features of the fiber optic apparatus, and decreases depth by angled mounting of splitter parking and horizontal positioning of vertically stacked ribbon-fanout kit (RFK) sets. Further, the fiber optic apparatus includes flexible tubing attached to a detachable strain relief bracket configured for removal the detachable strain relief bracket from the frame and reattachment to the telecommunications cabinet to facilitate flexibility in mounting of the fiber optic apparatus and fiber deployment.

5 Claims, 19 Drawing Sheets

Related U.S. Application Data

(60) Provisional application No. 62/464,008, filed on Feb. 27, 2017.

(52) U.S. Cl.
CPC ......... *G02B 6/4472* (2013.01); *G02B 6/4477* (2013.01); *G02B 6/4453* (2013.01)

(58) Field of Classification Search
USPC ....................................................... 385/135
See application file for complete search history.

(56) References Cited

U.S. PATENT DOCUMENTS

| | | | |
|---|---|---|---|
| 2003/0174996 A1* | 9/2003 | Henschel ............. | G02B 6/3897 385/135 |
| 2003/0210875 A1* | 11/2003 | Wagner ................ | G02B 6/4472 385/100 |
| 2006/0275009 A1 | 12/2006 | Ellison et al. | |
| 2007/0147765 A1 | 6/2007 | Gniadek et al. | |
| 2008/0124039 A1 | 5/2008 | Gniadek et al. | |
| 2009/0016043 A1 | 1/2009 | Hruby et al. | |
| 2010/0290753 A1 | 11/2010 | Tang et al. | |
| 2011/0064372 A1* | 3/2011 | Solheid ................ | G02B 6/3897 385/135 |

\* cited by examiner

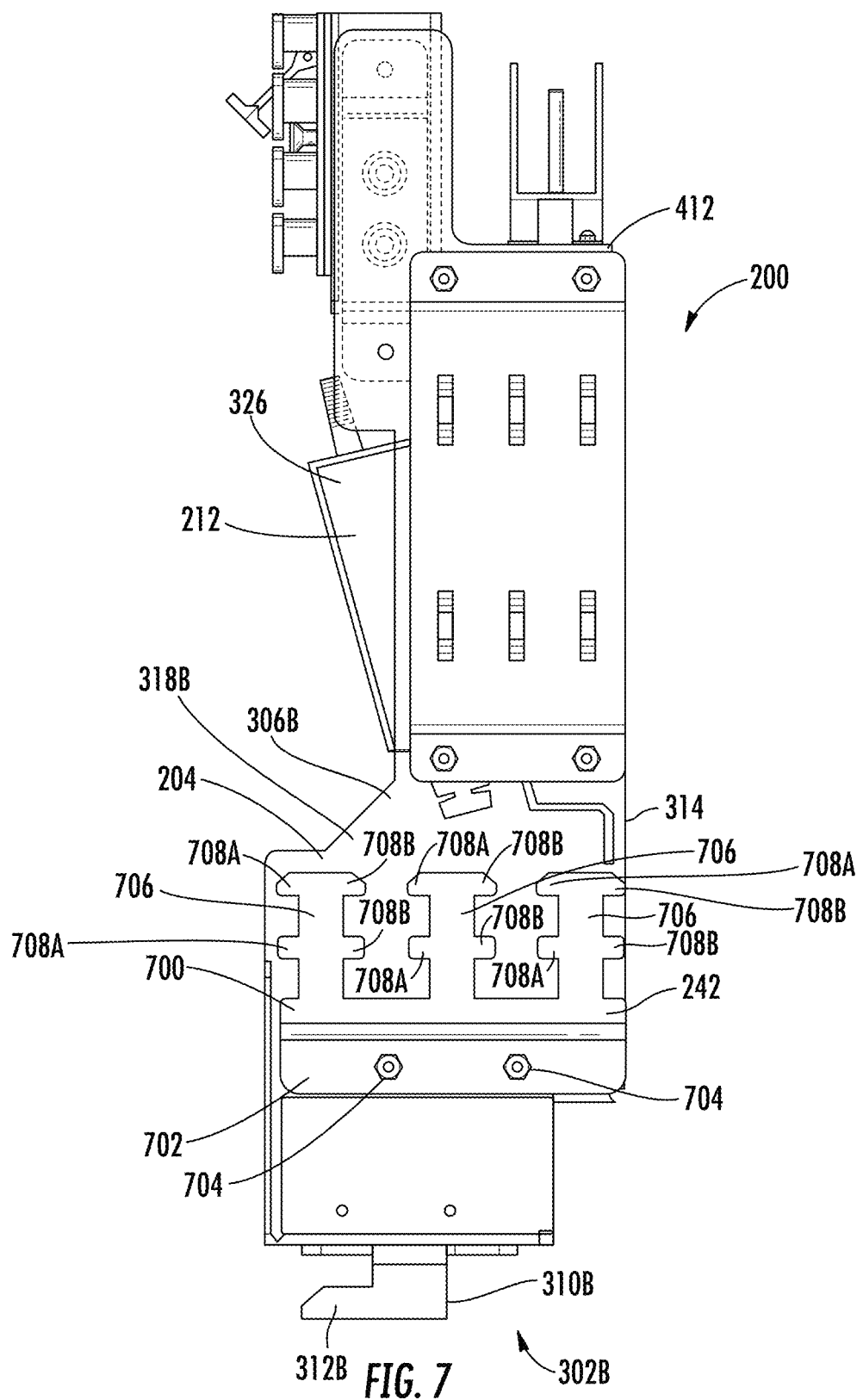

FIBER OPTIC APPARATUS FOR RETROFIT FIBER OPTIC CONNECTIVITY

PRIORITY APPLICATIONS

This application is a divisional of U.S. application Ser. No. 15/492,208, filed on Apr. 20, 2017, which claims the benefit of priority to U.S. Application No. 62/464,008, filed on Feb. 27, 2017, both applications being incorporated herein by reference.

BACKGROUND

This disclosure relates generally to fiber optic equipment, and in particular, to a fiber optic apparatus to provide retrofit fiber optic connectivity.

To improve network performance, communication and data networks are increasingly employing optical fiber. A fiber optic network provides optical signals over a distribution network comprised of fiber optic cables. The benefits of optical fiber are well known and include higher signal-to-noise ratios and increased bandwidth. Many areas are transitioning from copper to fiber for these reasons. In a fiber optic network, fiber optic connectivity and subscriber connection maintenance may be housed in a fiber optic cabinet, such as for example a fiber distribution hub.

In this regard, FIGS. 1A-1B are exemplary views of a typical fiber optic cabinet 100. Referring to FIG. 1A, the fiber optic cabinet 100 includes a housing 102 defining an interior 104 with fiber optic equipment 106 positioned within the interior 104 of the housing 102. In particular, the fiber optic equipment 106 includes a distribution panel 108 to connect and manage outgoing lines to a subscriber, a feeder panel 110 to connect and manage incoming lines from a provider, and a plurality of splitter modules 112 to connect the feeder panel 110 to the distribution panel 108. The distribution panel 108 is positioned toward a left side of the housing 102 and the feeder panel 110 and the splitter modules 112 are positioned toward a right side of the housing 102. The outgoing and incoming lines are connected to the distribution panel 108 and the feeder panel 110 by cables positioned behind the distribution panel 108 and/or the feeder panel 110. The splitter modules 112 are mounted on a sliding shelf 114, such that moving the shelf 114 forward and/or out of the interior 104 of the fiber optic cabinet 100 provides access to multiple splitter modules 112 per shelf 114. FIG. 1B is an exemplary perspective view of cabling 116 mounted within the typical fiber optic cabinet 100. In particular, the cabling 116 is positioned on the shelf 114 within the housing 102 of the fiber optic cabinet 100.

Such fiber optic cabinets 100 are typically configured with dimensional flexibility to accommodate various fiber optic equipment 106 and/or configurations thereof. For example, the width of the housing 102 may be increased to accommodate a larger distribution panel 108, more splitter modules 112, etc. The depth of the housing 102 may be increased to accommodate more cabling 116, etc.

However, transitioning from copper to fiber may be challenging or unavailable for certain areas if a fiber optic cabinet must be installed. For example, deployment of a fiber optic cabinet 100 may not be possible in areas that are topographically challenging, such as with narrow roads, no sidewalks, etc., even though those areas may include a cabinet housing electrical equipment (e.g., copper). In such cases, customers with a copper infrastructure may have no path to deployment of fiber using typical fiber optic cabinets 100. Even in cases where a fiber optic cabinet may be installed, doing so may be expensive, time consuming, and/or filled with regulatory hurdles.

Accordingly, there is a desire for an easy and effective transition from copper to fiber, particularly one that utilizes existing infrastructure.

No admission is made that any reference cited herein constitutes prior art. Applicant expressly reserves the right to challenge the accuracy and pertinency of any cited documents.

SUMMARY

Embodiments of the disclosure are directed to a fiber optic apparatus for retrofit fiber optic connectivity. In an exemplary embodiment, the fiber optic apparatus includes a frame configured for mounting in a telecommunications cabinet, a fiber optic connection array mounted to the frame, and a fiber optic cable assembly mounted to the frame and connected to the fiber optic connection array. The fiber optic apparatus is configured to reduce the size and footprint of a typical fiber optic cabinet for retrofit deployment within existing copper infrastructure, while allowing a user to provide and manage fiber optic network connections between a network provider and a plurality of subscribers. The fiber optic apparatus includes a splitter mount for mounting at least one fiber optic splitter module thereto, a feeder panel providing a plurality of feeder ports configured for optical communication with the fiber optic splitter module via a splitter input cable, and a distribution panel providing a plurality of distribution ports configured for optical communication with the fiber optic splitter module via a splitter output cable. The splitter mount, feeder panel, and distribution panel are vertically aligned to decrease the width of the fiber optic apparatus, and the fiber optic apparatus may include at least one routing guide vertically extending along at least part of the distribution panel to retain at least a portion of the splitter output cable therein. The fiber optic apparatus includes a connector parking panel with a recessed mounting surface for mounting splitter connectors at an oblique angle to minimize the depth of the fiber optic apparatus. The fiber optic apparatus includes a plurality of ribbon fan-out kit (RFK) sets with at least a portion of the input cables of a first RFK set extending beneath housings of a second RFK set to decrease the depth of the fiber optic apparatus. The fiber optic apparatus includes flexible tubing attached to a detachable strain relief bracket configured for removal of the detachable strain relief bracket from the frame and reattachment to the telecommunications cabinet to facilitate flexibility in mounting of the fiber optic apparatus and fiber deployment.

One embodiment of the disclosure relates to a fiber optic apparatus, comprising a frame, a splitter mount, a feeder panel, a distribution panel, and at least one routing guide. The frame has a first end and a second end. The frame is configured for placement in a telecommunications cabinet with the second end oriented toward a surface on which the telecommunications cabinet is secured and the first end oriented away from the surface on which the telecommunications cabinet is secured. The splitter mount is attached to the frame and configured for mounting at least one fiber optic splitter module thereto. The feeder panel is attached to the frame and positioned between the first end of the frame and the splitter mount. The feeder panel comprises at least one feeder port connector adapter. The distribution panel is attached to the frame and positioned between the first end of the frame and the feeder panel. The distribution panel comprises a plurality of distribution port connector adapters.

The at least one routing guide extends along the distribution panel at least part of a distance between the first end and the second end. The at least one routing guide defines a routing channel configured to retain the splitter output cables therein.

An additional embodiment of the disclosure relates to a fiber optic apparatus, comprising a frame, a splitter mount, a feeder panel, a distribution panel, and a connector parking panel. The frame has a first end and a second end. The frame is configured for placement in a telecommunications cabinet with the second end oriented toward a surface on which the telecommunications cabinet is secured and the first end oriented away from the surface on which the telecommunications cabinet is secured. The splitter mount is attached to the frame and configured for mounting at least one fiber optic splitter module thereto. The feeder panel is attached to the frame. The feeder panel comprises at least one feeder port connector adapter. The distribution panel is attached to the frame. The distribution panel comprises a plurality of distribution port connector adapters. The connector parking panel is positioned between the first end of the frame and the splitter mount. The connector parking panel comprises a recessed mounting surface obliquely angled relative to the frame.

An additional embodiment of the disclosure relates to a fiber optic apparatus, comprising a frame, a distribution panel, and a fiber optic cable assembly. The frame has a first end, a second end, a first side extending between the first end and the second end, and a second side extending between the first end and the second end. The frame is configured for placement in a telecommunications cabinet with the second end oriented toward a surface on which the telecommunications cabinet is secured and the first end oriented away from the surface on which the telecommunications cabinet is secured. The distribution panel is attached to the frame and comprising a plurality of distribution port connector adapters. The fiber optic cable assembly is in optical communication with the plurality of distribution port connector adapters. The fiber optic cable assembly comprises a first ribbon fan-out kit (RFK) set and a second RFK set. The first ribbon fan-out kit set is positioned between the second end and the distribution panel. The first RFK set comprises a plurality of RFKs. The second RFK set is positioned between the second end and the distribution panel and further positioned between the second side and the first RFK set. The second RFK set comprises a plurality of RFKs. Each of the plurality of RFKs of the first and second RFK sets comprises a housing, at least one input cable attached approximately at a first end of the housing, and a plurality of output cables attached approximately at a second end of the housing opposite the first end. At least a plurality of the housings of the first RFK set are stacked along a direction between the first end and the second end of the frame. At least a portion of the input cables of the first RFK set is positioned between the second end of the frame and the housings of the second RFK set.

An additional embodiment of the disclosure relates to a fiber optic apparatus, comprising a frame, a distribution panel, a detachable strain relief bracket, and a fiber optic cable assembly. The frame has a first end, a second end, a first side extending between the first end and the second end, and a second side extending between the first end and the second end. The frame is configured for placement in a telecommunications cabinet with the second end oriented toward a surface on which the telecommunications cabinet is secured and the first end oriented away from the surface on which the telecommunications cabinet is secured. The distribution panel is attached to the frame and comprises a plurality of distribution port connector adapters. The detachable strain relief bracket is removably mounted to the second side of the frame. The fiber optic cable assembly is in optical communication with the plurality of distribution port connector adapters. The fiber optic cable assembly comprises an armored tail and flexible tubing. The armored tail is attached to and downwardly extending from the detachable strain relief bracket. The flexible tubing has a first end at the second side of the frame and a second end attached to the detachable strain relief bracket.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIG. 7 is a partial side view of the fiber optic apparatus of FIGS. 2-6C illustrating a detachable strain relief bracket;

DETAILED DESCRIPTION

Embodiments of the disclosure are directed to a fiber optic apparatus for retrofit fiber optic connectivity. In an exemplary embodiment, the fiber optic apparatus includes a frame configured for mounting in a telecommunications cabinet, a fiber optic connection array mounted to the frame, and a fiber optic cable assembly mounted to the frame and connected to the fiber optic connection array. The fiber optic apparatus is configured to reduce the size and footprint of a typical fiber optic cabinet for retrofit deployment within existing copper infrastructure, while allowing a user to provide and manage fiber optic network connections between a network provider and a plurality of subscribers. The fiber optic apparatus includes a splitter mount for mounting at least one fiber optic splitter module thereto, a feeder panel providing a plurality of feeder ports configured for optical communication with the fiber optic splitter module via a splitter input cable, and a distribution panel providing a plurality of distribution ports configured for optical communication with the fiber optic splitter module via a splitter output cable. The splitter mount, feeder panel, and distribution panel are vertically aligned to decrease the width of the fiber optic apparatus, and the fiber optic apparatus may include at least one routing guide vertically extending along at least part of the distribution panel to retain at least a portion of the splitter output cable therein. The fiber optic apparatus includes a connector parking panel with a recessed mounting surface for mounting splitter connectors at an oblique angle to minimize the depth of the fiber optic apparatus. The fiber optic apparatus includes a plurality of ribbon fan-out kit (RFK) sets with at least a portion of the input cables of a first RFK set extending beneath housings of a second RFK set to decrease depth of the fiber optic apparatus. The fiber optic apparatus includes flexible tubing attached to a detachable strain relief bracket configured for removal of the detachable strain relief bracket from the frame and reattachment to the telecommunications cabinet to facilitate flexibility in mounting of the fiber optic apparatus and fiber deployment.

Additional features and advantages will be set forth in the detailed description which follows, and in part will be readily apparent to those skilled in the art from that description or recognized by practicing the embodiments as described herein, including the detailed description which follows, the claims, as well as the appended drawings.

Figure 1A:
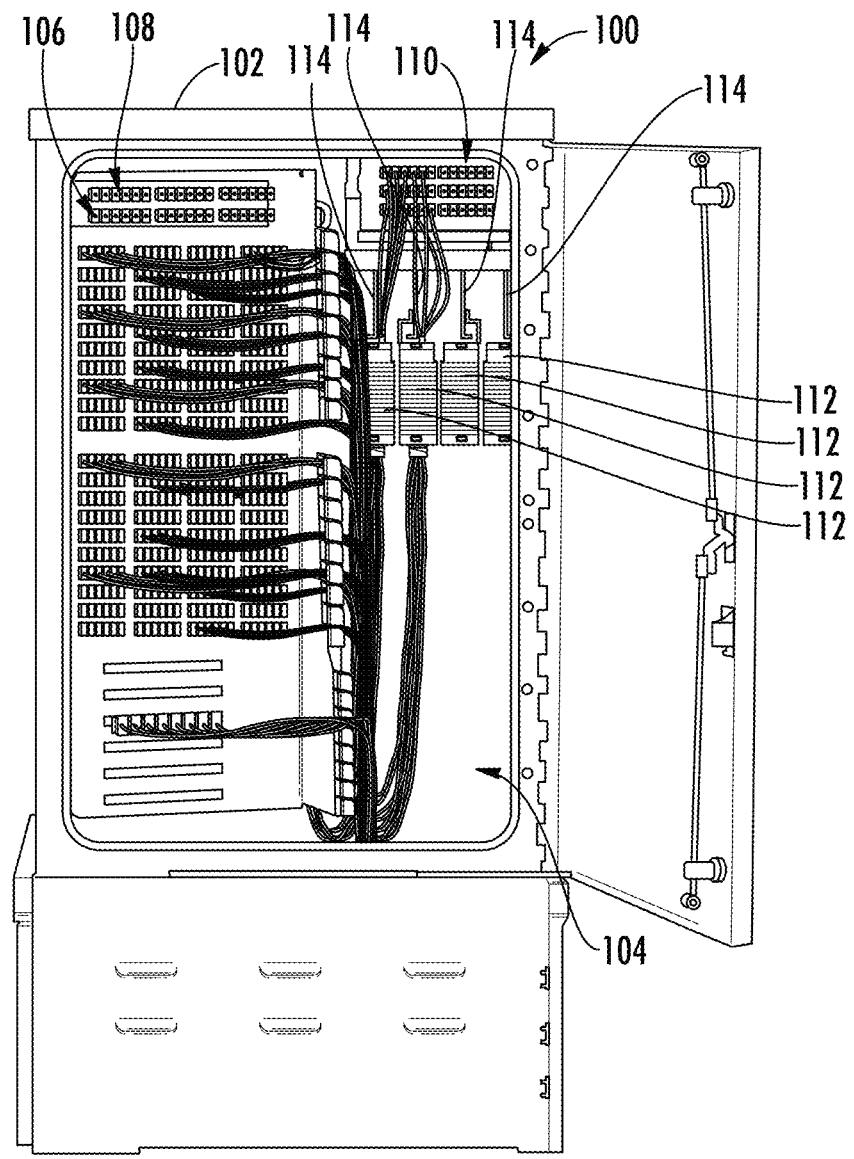
FIG. 1A is an exemplary perspective view of a typical fiber optic cabinet.
Figure 1B:
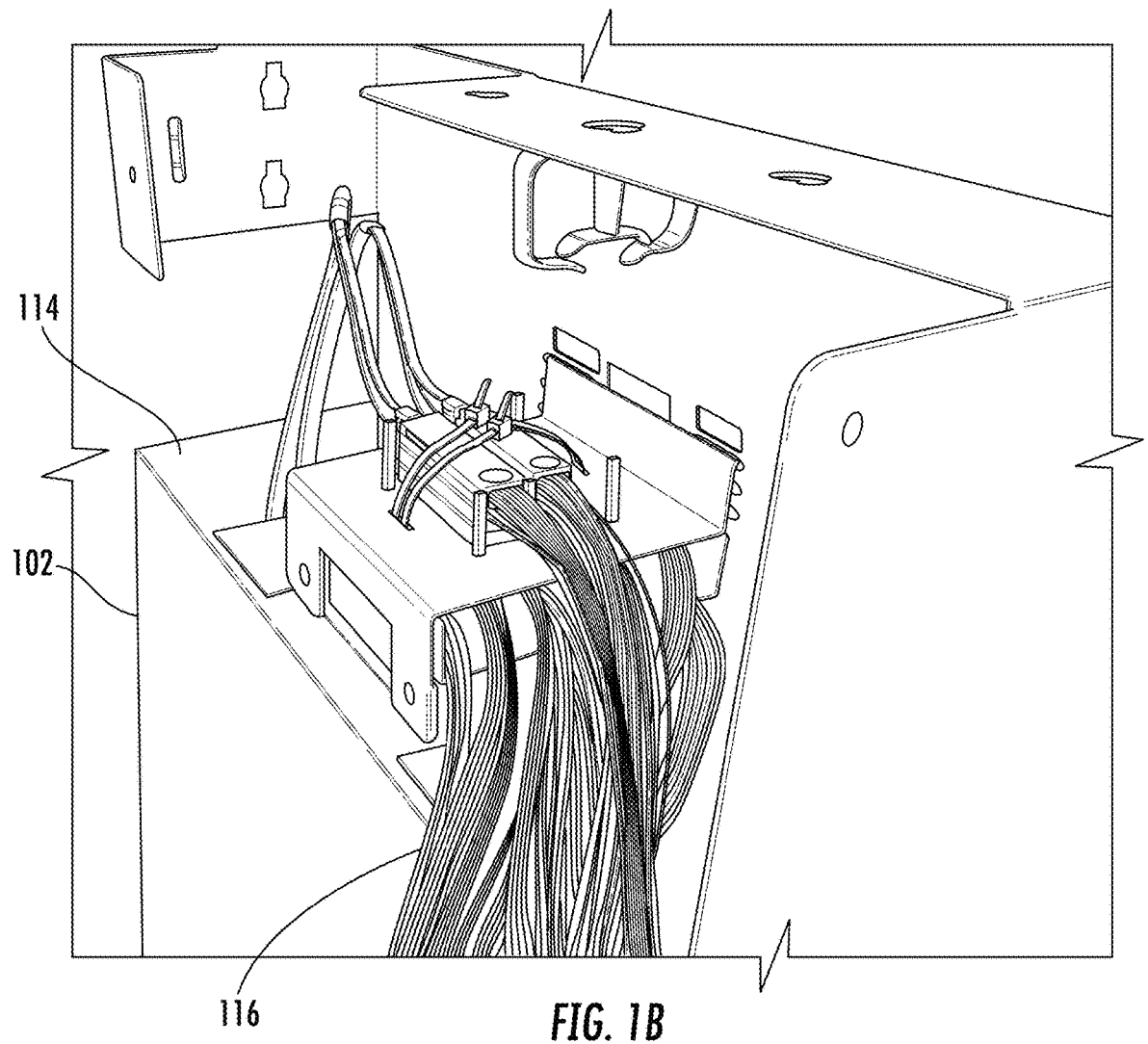
FIG. 1B is an exemplary perspective view of cabling mounted within the typical fiber optic cabinet of FIG. 1A.
Figure 2:
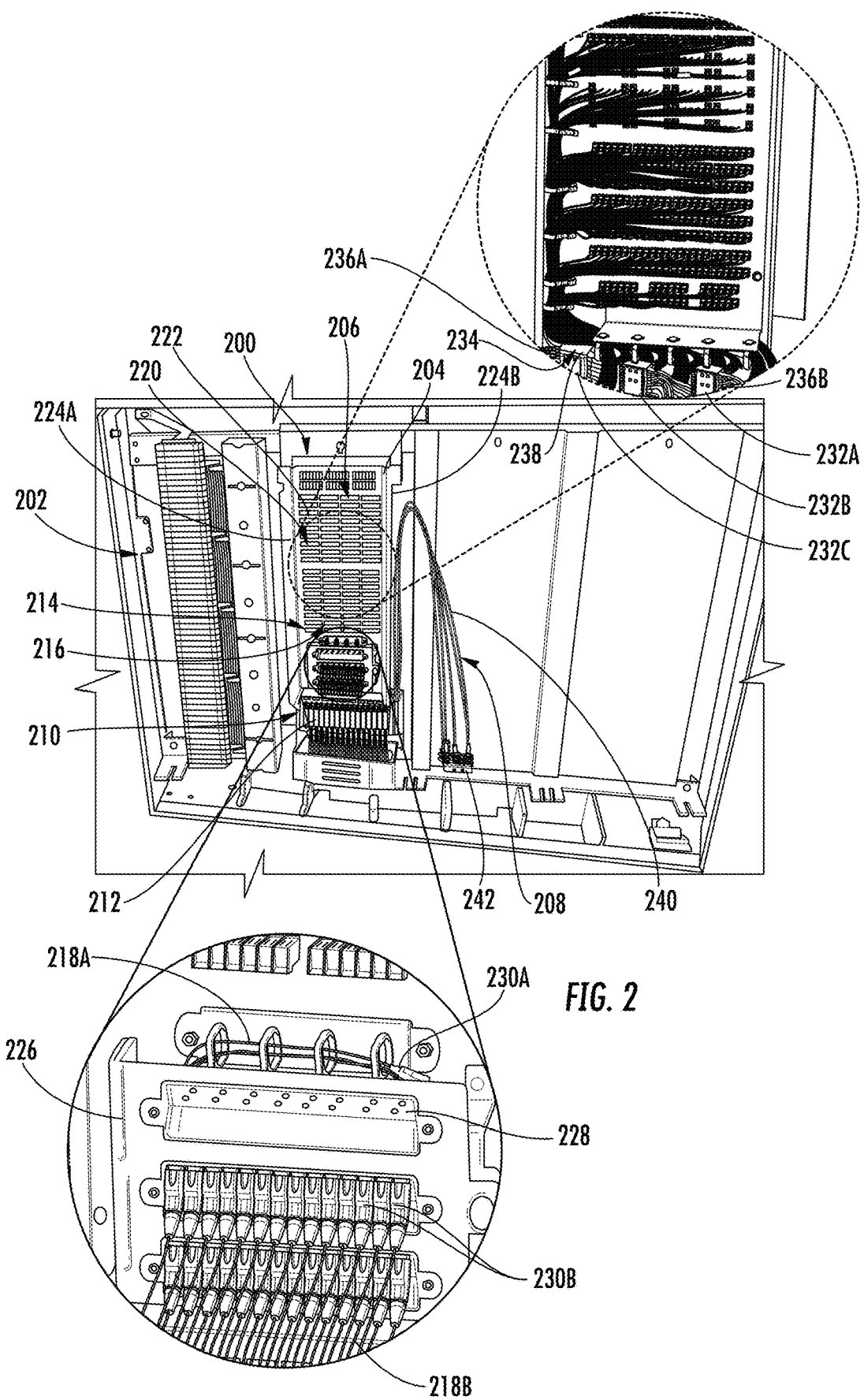
FIG. 2 is an exemplary perspective view of a fiber optic apparatus of the present disclosure mounted within a telecommunications cabinet.

In this regard, FIG. 2 is an exemplary perspective view of a fiber optic apparatus 200 of the present disclosure mounted within a telecommunications cabinet 202. The fiber optic apparatus 200 is configured for retrofit fiber optic connectivity. The fiber optic apparatus 200 includes a frame 204 (also referred to herein as a frame body) configured for mounting in the telecommunications cabinet 202, a fiber optic connection array 206 mounted to the frame 204, and a fiber optic cable assembly 208 mounted to the frame 204 and connected to the fiber optic connection array 206. The fiber optic apparatus 200 is configured to reduce the size and footprint of a typical fiber optic cabinet for retrofit deployment within existing copper infrastructure (e.g., a telecommunications cabinet 202), while allowing a user to provide and manage fiber optic network connections between a network provider and a plurality of subscribers. The fiber optic apparatus 200 includes a splitter mount 210 for mounting at least one fiber optic splitter module 212 thereto, a feeder panel 214 providing a plurality of feeder ports 216 configured for optical communication with the fiber optic splitter modules 212 via a splitter input cable 218A (also referred to as a splitter input leg), and a distribution panel 220 providing a plurality of distribution ports 222 configured for optical communication with the fiber optic splitter module 212 via a splitter output cable 218B (also referred to as a splitter output leg). The splitter mount 210, feeder panel 214, and distribution panel 220 are vertically aligned to decrease the width of the fiber optic apparatus 200, and the fiber optic apparatus 200 may include at least one routing guide 224A, 224B vertically extending along at least part of the distribution panel 220 to retain at least a portion of the splitter output cables 218B therein. The fiber optic apparatus 200 includes a connector parking panel 226 with a recessed mount surface 228 for mounting splitter output connectors 230B (in communication with splitter input connectors 230A) for the splitter output cables 218B at an oblique angle to minimize the depth of the fiber optic apparatus 200. The fiber optic apparatus 200 includes a plurality of ribbon fan-out kit (RFK) sets 232A-232C, each RFK set 232A-232C including at least one RFK 234. At least a portion of input cables 236A of a first RFK set 232A (in communication with splitter output cables 236B) extend beneath housings 238 of the second RFK set 232B to decrease depth of the fiber optic apparatus 200. The fiber optic apparatus 200 includes flexible tubing 240 attached to a detachable strain relief bracket 242 configured for removal the detachable strain relief bracket 242 from the frame 204 and reattachment to the telecommunications cabinet 202 to facilitate flexibility in mounting of the fiber optic apparatus 200 and fiber deployment.

Figure 3A:
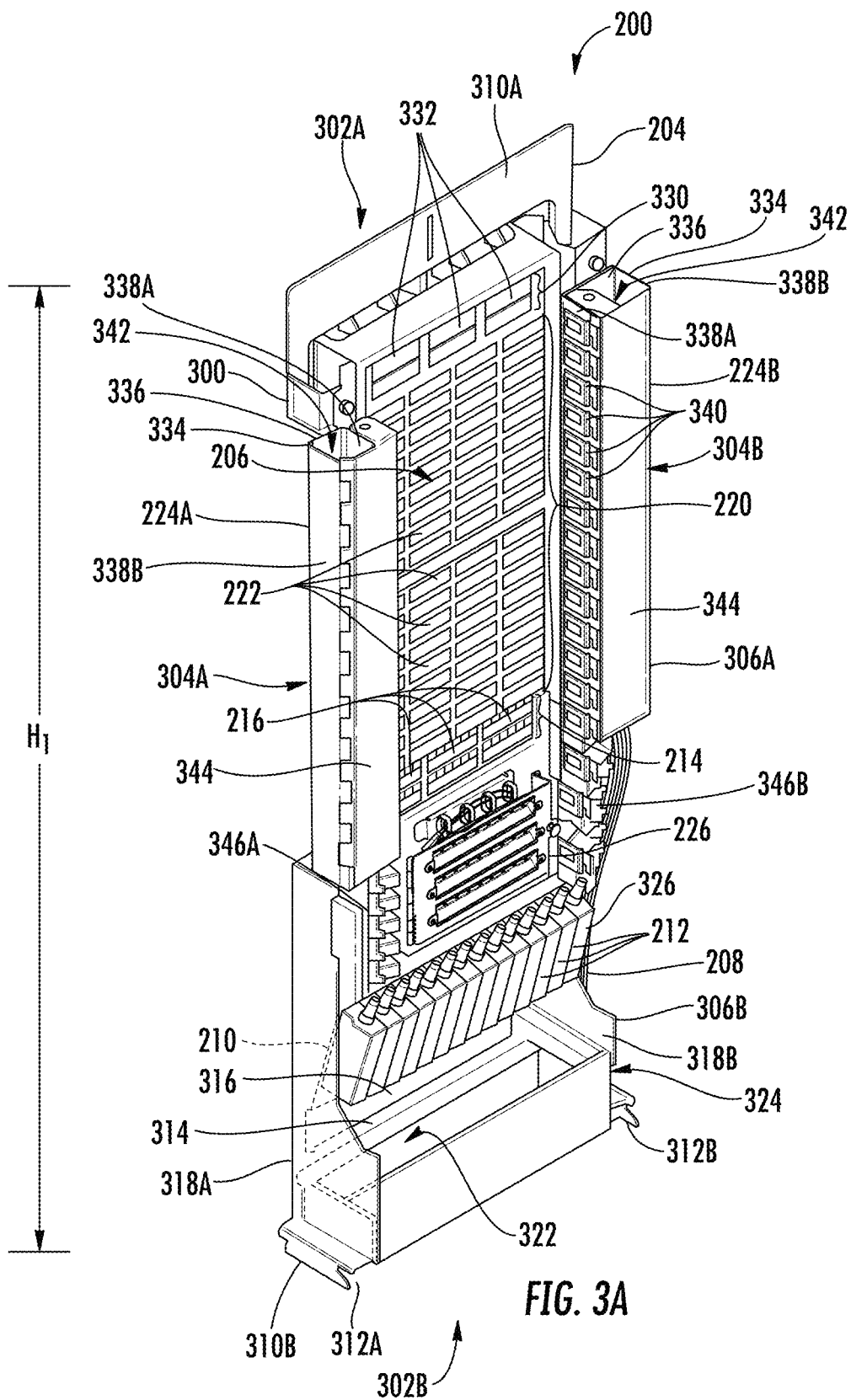
FIG. 3A is an exemplary front perspective view of the fiber optic apparatus of FIG. 2.
Figure 3B:
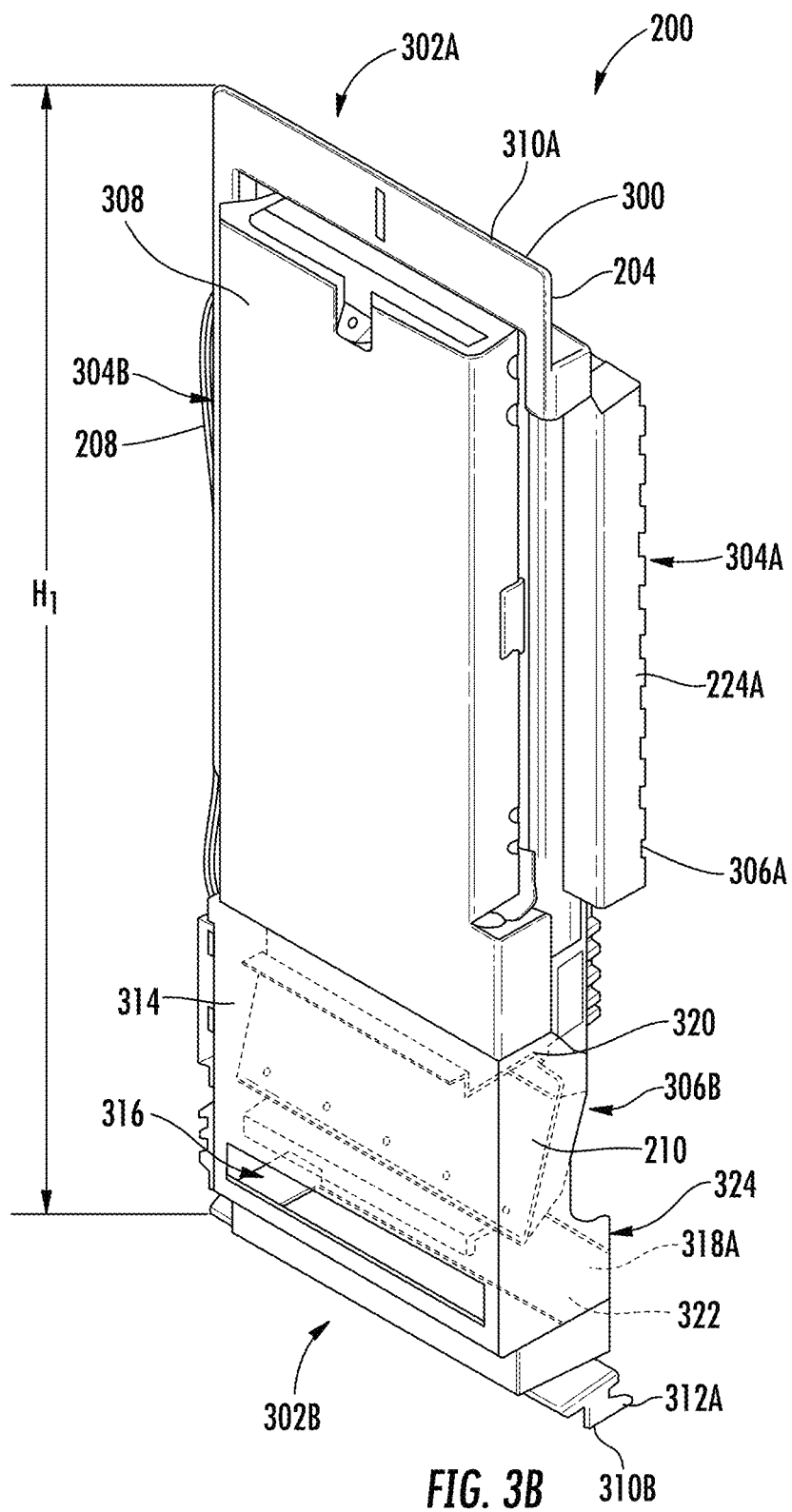
FIG. 3B is an exemplary back perspective view of the fiber optic apparatus of FIG. 2.

FIGS. 3A-3B are views of the fiber optic apparatus 200 of FIG. 2. The fiber optic apparatus 200 includes a support structure 300, the fiber optic connection array 206 mounted to the support structure 300, and the fiber optic cable assembly 208 mounted to the support structure 300. The fiber optic connection array 206 allows a user to manage fiber optic connections. The fiber optic cable assembly 208 provides fiber optic cabling for fiber optic communication through the fiber optic apparatus 200. In certain embodiments, the fiber optic apparatus 200 has a height H1 between 40 inches and 60 inches, and is configured to provide fiber optic connections for up 432 distribution fibers in some embodiments. In other embodiments, the fiber optic apparatus is configured to provide connections for up to 864 distribution fibers when installing two fiber optic apparatuses 200 in a back to back or side by side configuration within the telecommunications cabinet 202. The fiber optic apparatus 200 is configured for retrofit deployment within a telecommunications cabinet 202 (see FIG. 2) for easy transition from copper or electrical to fiber, to take advantage of existing copper infrastructure, to minimize time and cost of installation of fiber optic equipment, to avoid construction permits and other regulatory requirements, etc.

The support structure 300 of the fiber optic apparatus 200 includes a frame body 204. The frame body 204 includes a first end 302A (also referred to as a top end), a second end 302B (also referred to as bottom end) opposite the first end 302A, a first side 304A (also referred to as a left side) that extends between the top end 302A and the bottom end 302B, and a second side 304B (also referred to as a right side) that extends between the top end 302A and the bottom end 302B and opposite to the first side 304A. The frame body 204 further includes a first body 306A (also referred to as an upper body) positioned toward the top end 302A and a second body 306B (also referred to as a lower body) positioned toward the bottom end 302B. The upper body 306A supports and mounts the fiber optic connection array 206 (explained in more detail below). Directional terms, such as "top," "bottom," "upper," "lower," "left," "right," "medial," "distal," etc. are used for non-limiting illustrative purposes only.

The frame body 204 further includes a rear protective cover 308 (also referred to as a back protective cover) to selectively enclose at least a portion of the fiber optic cable assembly 208 (explained in more detail below). In particular, the rear protective cover 308 may be pivotally (e.g., hingedly) and/or removably attached to the upper body 306A. The frame body 204 further includes a top installation bracket 310A positioned at the top end 302A of the frame body 204 and a bottom installation bracket 310B positioned at the bottom end 302B of the frame body 204. The top installation bracket 310A and the bottom installation bracket 310B mount the fiber optic apparatus 200 to the telecommunications cabinet 202 (explained in more detail below). The bottom installation bracket 310B includes a left hook 312A forwardly extending from a left side of the bottom installation bracket 310B and a right hook 312B forwardly extending from a right side of the bottom installation bracket 310B. The left and right hooks 312A, 312B facilitate mounting and selective pivoting of the fiber optic apparatus 200 relative to the telecommunications cabinet 202 for selective access to the area of the telecommunications cabinet 202 directly behind the fiber optic apparatus 200.

The lower body 306B includes a back wall 314, a first sidewall 318A (also referred to as a left sidewall) forwardly extending from a left side of the back wall 314 and a second sidewall 318B (also referred to as a right sidewall) opposite the left sidewall 318A and forwardly extending from a right side of the back wall 314. The back wall 314 may define an opening 316 for cross-connection of fiber optic splitter modules 212 between multiple fiber optic apparatuses 200 set up in a back to back orientation. The lower body 306B includes an upper wall 320 extending between the left and right sidewalls 318A, 318B from a top thereof. The lower body 306B further includes a bottom container 322 (also referred to as slack storage) extending between the left and right sidewalls 318A, 318B from a bottom thereof. The bottom container 322 is configured to receive and hold slack of the splitter output cables 218B from the fiber optic splitter modules 212 when the fiber optic splitter modules 212 are mounted to the lower body 306B (explained in more detail below).

Figure 4A:
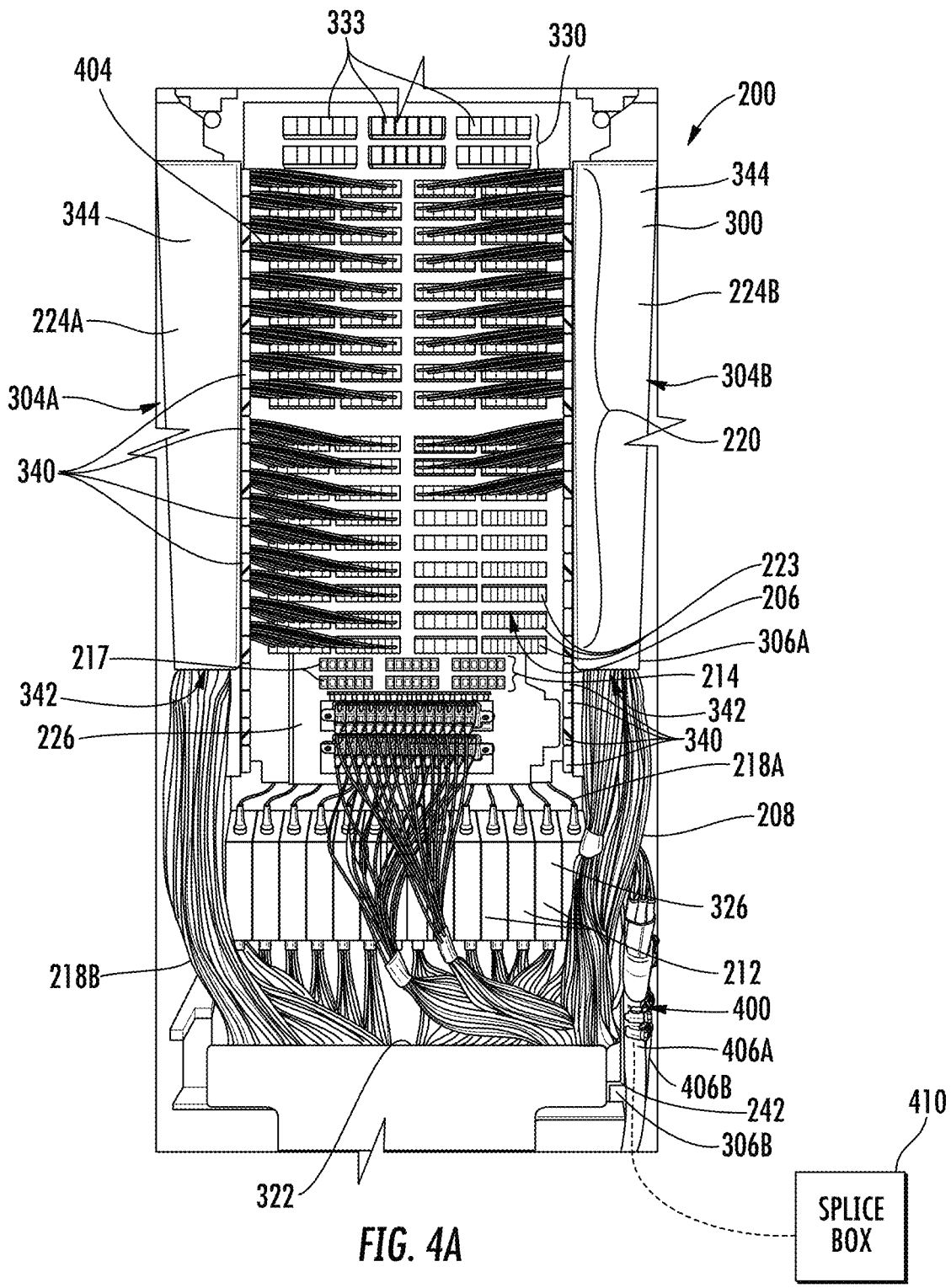
FIG. 4A is an exemplary front perspective view of the fiber optic apparatus of FIGS. 2-3B illustrating front wiring.

A splitter installation 324 includes a splitter mount 210 extending from the left side 304A of the fiber optic apparatus 200 to the right side 304B of the fiber optic apparatus 200 and positioned between the left and right sidewalls 318A, 318B of the lower body 306B, and between the upper wall 320 of the lower body 306B and the bottom container 322. The splitter mount 210 is configured for mounting of one or more fiber optic splitter modules 212 thereto. The splitter mount 210 is obliquely angled relative to the frame body 204 and/or the bottom container 322 to direct the slack from the splitter output cables 218B of the fiber optic splitter modules 212 into the bottom container 322. Each fiber optic splitter module 212 includes a housing 326, at least one splitter input cable 218A (see FIG. 4A) extending from a first end (also referred to as a top) of the housing 326, and one or more splitter output cables 218B (see FIG. 4A) extending from a second end (also referred to as a bottom) of the housing 326. It is noted that the terms "input" and "output" are for non-limiting illustrative purposes only, and all cables are bidirectional unless otherwise noted. By way of example, each fiber optic splitter module 212 may provide thirty-two splitter output cables 218B for each splitter input cable 218A. In other embodiments, each fiber optic splitter module 212 may include more or less than thirty-two output cables 218B (e.g., 1×4 splitter modules, 1×8 splitter modules, and 1×16 splitter modules). The fiber optic splitter modules 212 are adjacently mounted to one another on the splitter mount 210 from the left side 304A of the frame body 204 to the right side 304B of the frame body 204. In this way, the splitter mount 210 may be configured to mount between one and twenty fiber optic splitter modules 212 (e.g., fourteen fiber optic splitter modules 212). In some embodiments, the splitter mount 210 may be configured to mount more than twenty fiber optic splitter modules 212. When mounted, the splitter input cables 218A extend upwardly and the splitter output cables 218B extend downwardly, as illustrated in FIG. 4A. The fiber optic splitter modules 212 are mounted at an angle relative to the frame body 204 so that the slack of the downwardly extending splitter output cables 218B is set farther back from a front of the fiber optic apparatus 200. In other words, the fiber optic splitter modules 212 are obliquely angled so that the downwardly extending splitter output cables 218B fall closer to a back of the bottom container 322 of the fiber optic apparatus 200, to facilitate organization.

Figure 5A:
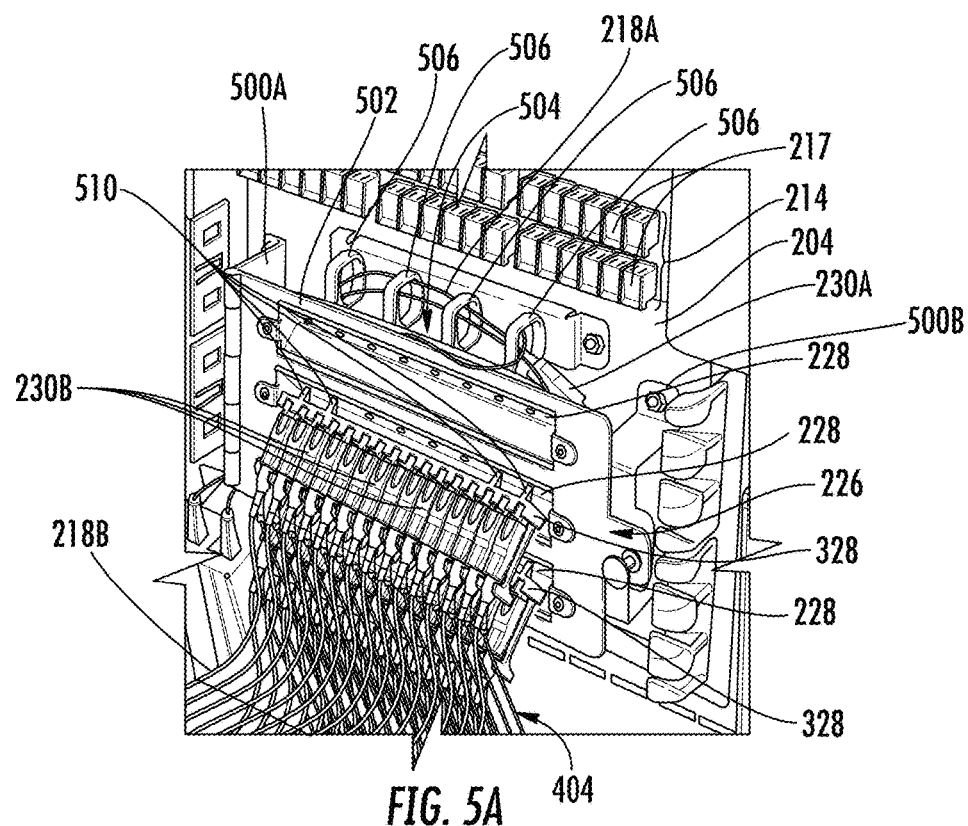
FIG. 5A is an exemplary front view of the connector parking panel with splitter connectors and connector parking blocks mounted thereto.

Referring momentarily to FIG. 5A, the splitter installation 324 further includes a connector parking panel 226 for removably mounting one or more parking blocks 328. The connector parking panel 226 extends from the left side 304A of the fiber optic apparatus 200 to the right side 304B of the fiber optic apparatus 200. Each parking block 328 mounts one or more splitter output connectors 230B, and in particular, splitter output connectors 230B not connected to the fiber optic connection array 206. The parking block 328 is removably attachable to the connector parking panel 226. In this way, the parking block 328 can attach multiple splitter output connectors 230B, and provide easy access to such splitter output connectors 230B.

Referring again to FIGS. 3A-3B, the connector parking panel 226 is positioned above the splitter mount 210. In this way, the extra slack from the unconnected splitter output cables 218B (see FIG. 4A) of the fiber optic splitter modules 212 are kept out of the way of the rest of the fiber optic apparatus 200, but remain easily accessible for subsequent connection of the splitter output connectors 230B (see FIG. 5A) of the splitter output cables 218B to the fiber optic connection array 206 (explained in more detail below).

The fiber optic connection array 206 includes a feeder panel 214, a distribution panel 220, and a pass-through panel 330. Each of the feeder panel 214, the distribution panel 220, and the pass-through panel 330 extend from the left side 304A of the fiber optic apparatus 200 to the right side 304B of the fiber optic apparatus 200. The feeder panel 214, the distribution panel 220, and the pass-through panel 330 may be separate panels that are each separately coupled to the frame body 204 or one or more of the feeder panel 214, the distribution panel 220, and the pass-through panel 330 may be configured as a single, unitary component that is then coupled to the frame body 204. In other embodiments, one or more of the feeder panel 214, the distribution panel 220, and the pass-through panel 330 may be unitarily formed with the frame body 204.

The feeder panel 214 is positioned above the connector parking panel 226 such that the connector parking panel 226 is positioned between the feeder panel 214 and the splitter mount 210. The feeder panel 214 includes a plurality of feeder ports 216 configured to receive feeder port connector adapters 217 (see FIG. 4A) for connection of the splitter input connectors 230A (see FIG. 5A) of the splitter input cables 218A of the fiber optic splitter modules 212 thereto. Accordingly, it is advantageous to position the feeder panel 214 proximate to the fiber optic splitter modules 212. Each of the feeder port connector adapters 217 of the feeder ports 216 is configured for optical communication with a network provider (e.g., central office). The feeder port connector adapters 217 of the feeder ports 216 can be configured in columns and rows for organizational purposes.

The distribution panel 220 is positioned above the feeder panel 214 such that the feeder panel 214 is positioned between the connector parking panel 226 and the distribution panel 220. The distribution panel 220 includes a plurality of distribution ports 222 configured to receive distribution port connector adapters 223 (see FIG. 4A) for connection of the splitter output connectors 230B of the splitter output cables 218B of the fiber optic splitter modules 212 thereto. Each of the distribution port connector adapters 223 (see FIG. 4A) of the distribution ports 222 is configured for optical communication with a subscriber (e.g., home subscriber). The distribution port connector adapters 223 of the distribution ports 222 can be configured in columns and rows for organizational purposes.

The pass-through panel 330 is positioned above the distribution panel 220 such that the distribution panel 220 is positioned between the feeder panel 214 and the pass-through panel 330. The pass-through panel 330 includes a plurality of pass-through ports 332 configured to receive pass-through port connector adapters 333 (see FIG. 4A) for direct connections between the feeder port connector adapters 217 (see FIG. 4A) of the feeder ports 216 of the feeder panel 214 and the pass-through port connector adapters 333 (see FIG. 4A) of the pass-through ports 332. Thus, the pass-through panel 330 provides optical fiber connections with larger bandwidth than those of the distribution ports 222 of the distribution panel 220. Each of the pass-through port connector adapters 333 of the pass-through ports 332 is configured for optical communication with a subscriber (e.g., business subscriber). The pass-through port connector adapters 333 of the pass-through ports 332 can be configured in columns and rows for organizational purposes.

The support structure 300 of the fiber optic apparatus 200 further includes left and right routing guides 224A, 224B positioned, respectively, along the left side 304A and the right side 304B of the fiber optic apparatus 200. The left and right routing guides 224A, 224B are vertically oriented and organize the splitter output cables 218B of the fiber optic splitter modules 212 connected to fiber optic connection array 206 (explained in more detail below). The left routing guide 224A includes a u-shaped bracket 334 having a back wall 336, a medial wall 338A (also referred to as a right wall) forwardly extending from an edge of the back wall 336 proximate a center of the fiber optic apparatus 200, and a distal wall 338B (also referred to as a left wall) forwardly extending from an edge of the back wall 336 away from the center of the fiber optic apparatus 200. The back wall 336, medial wall 338A, and distal wall 338B define a vertical routing channel 342 (with an open top and an open bottom) for routing of the splitter output cables 218B (see FIG. 4A) of the fiber optic splitter modules 212 therethrough. The back wall 336 of the left routing guide 224A is attached at a front surface of the frame body 204 and/or the fiber optic connection array 206. In this way, the left routing guide 224A forwardly extends from the frame body 204 and/or the fiber optic connection array 206 (e.g., feeder ports 216 of the feeder panel 214, distribution ports 222 of the distribution panel 220, pass-through ports 332 of the pass-through panel 330) to provide routing access of the splitter output cables 218B (see FIG. 4A) up through the left routing guide 224A and inwardly to their respective port (e.g., feeder ports 216, distribution ports 222, pass-through ports 332), as explained in more detail below.

The left routing guide 224A further includes a front cover 344 pivotally (also referred to as hingedly) attached to a distal wall 338B of the u-shaped bracket 334. Accordingly, the front cover 344 is movable between a closed position and an open position. In the closed position, the front cover 344 extends between the medial wall 338A and the distal wall 338B enclosing the vertical routing channel 342. The medial wall 338A includes a plurality of fiber guide slots 340 (the fiber guide slots 340 of the medial wall 338A of the left routing guide 224A are hidden in FIG. 3A but are similar to the fiber guide slots 340 of the medial wall 338A of the right routing guide 224B, which is visible in FIG. 3A) aligned along a vertical length of the medial wall 338A for insertion of one or more splitter output cables 218B (see FIG. 4A) therein, such that the one or more splitter output cables 218B (see FIG. 4A) extend out of the vertical routing channel 342 to the respective port (e.g., distribution port 222). Thus, each fiber guide slot 340 is positioned adjacent to a row of distribution ports 222 in the distribution panel 220. For example, referring momentarily to FIG. 4A, the splitter output cables 218B are directed from the housing 326 of each the fiber optic splitter module 212 downwardly into the bottom container 322, to the left side of the bottom container 322, up the left side of the frame body 204 through a bottom opening of the vertical routing channel 342 of the left routing guide 224A and then inwardly through a fiber guide slot 340 (see FIG. 3A) to one of the distribution port connector adapters 223 of the distribution ports 222 (see FIG. 3A) adjacent to the fiber guide slot 340 (see FIG. 3A). This arrangement organizes the splitter output cables 218B and keeps the distribution panel 220 open and accessible.

Referring again to FIGS. 3A and 3B, in certain embodiments a plurality of left lower fiber guide slots 346A may be positioned on a left side of the connector parking panel 226 for securement of splitter output cables 218B (see FIG. 4A) and/or other cables in physical connection with the distribution port connector adapters 223 (see FIG. 4A) of the feeder ports 216 of the feeder panel 214, as the left routing guide 224A may only extend up to but not past the feeder panel 214 to leave sufficient room for mounting the top installation bracket 310A.

Similarly, the right routing guide 224B includes a u-shaped bracket 334 having a back wall 336, a medial wall 338A (also referred to as a left wall) forwardly extending from an edge of the back wall 336 proximate a center of the fiber optic apparatus 200, and a distal wall 338B (also referred to as a right wall) forwardly extending from an edge of the back wall 336 away from the center of the fiber optic apparatus 200. The back wall 336, medial wall 338A, and distal wall 338B define a vertical routing channel 342 (with an open top and an open bottom) for routing of the splitter output cables 218B (see FIG. 4A) of the fiber optic splitter modules 212 therethrough. The back wall 336 of the right routing guide 224B is attached at a front surface of the frame body 204 and/or the fiber optic connection array 206. In this way, the right routing guide 224B forwardly extends from the frame body 204 and/or the fiber optic connection array 206 (e.g., feeder ports 216 of the feeder panel 214, distribution ports 222 of the distribution panel 220, pass-through ports 332 of the pass-through panel 330) to provide routing access of the splitter output cables 218B up through the right routing guide 224B and inwardly to their respective port (e.g., feeder ports 216, distribution ports 222, pass-through ports 332), as explained in more detail below.

The right routing guide 224B further includes a front cover 344 pivotally (also referred to as hingedly) attached to a distal wall 338B of the u-shaped bracket 334. Accordingly, the front cover 344 is movable between a closed position and an open position. In the closed position, the front cover 344 extends between the medial wall 338A and the distal wall 338B enclosing the vertical routing channel 342. The medial wall 338A includes a plurality of fiber guide slots 340 aligned along a vertical length of the medial wall 338A for insertion of one or more splitter output cables 218B therein, such that the one or more splitter output cables 218B extend out of the vertical routing channel 342 to the respective port (e.g., distribution port 222). Thus, each fiber guide slot 340 is positioned adjacent to a row of distribution ports 222 in the distribution panel 220. Referring momentarily to FIG. 4A, the splitter output cables 218B are directed from the housing 326 of the fiber optic splitter module 212 downwardly into the bottom container 322, to the right side of the bottom container 322, up the right side of the frame body 204 through a bottom opening of the vertical routing channel 342 of the right routing guide 224B, and then inwardly through a fiber guide slot 340 (see also FIG. 4A) to one of the distribution port connector adapters 223 of the distribution ports 222 adjacent to the fiber guide slot 340. This arrangement organizes the splitter output cables 218B and keeps the distribution panel 220 open and accessible.

Referring again to FIGS. 3A and 3B, in certain embodiments a plurality of right lower fiber guide slots 346B may be positioned on a right side of the connector parking panel 226 for securement of splitter output cables 218B and/or other cables in physical connection with the feeder ports 216 of the feeder panel 214, as the right routing guide 224B may only extend up to but not past the feeder panel 214 to leave sufficient room for mounting the top installation bracket 310A.

Figure 4B:
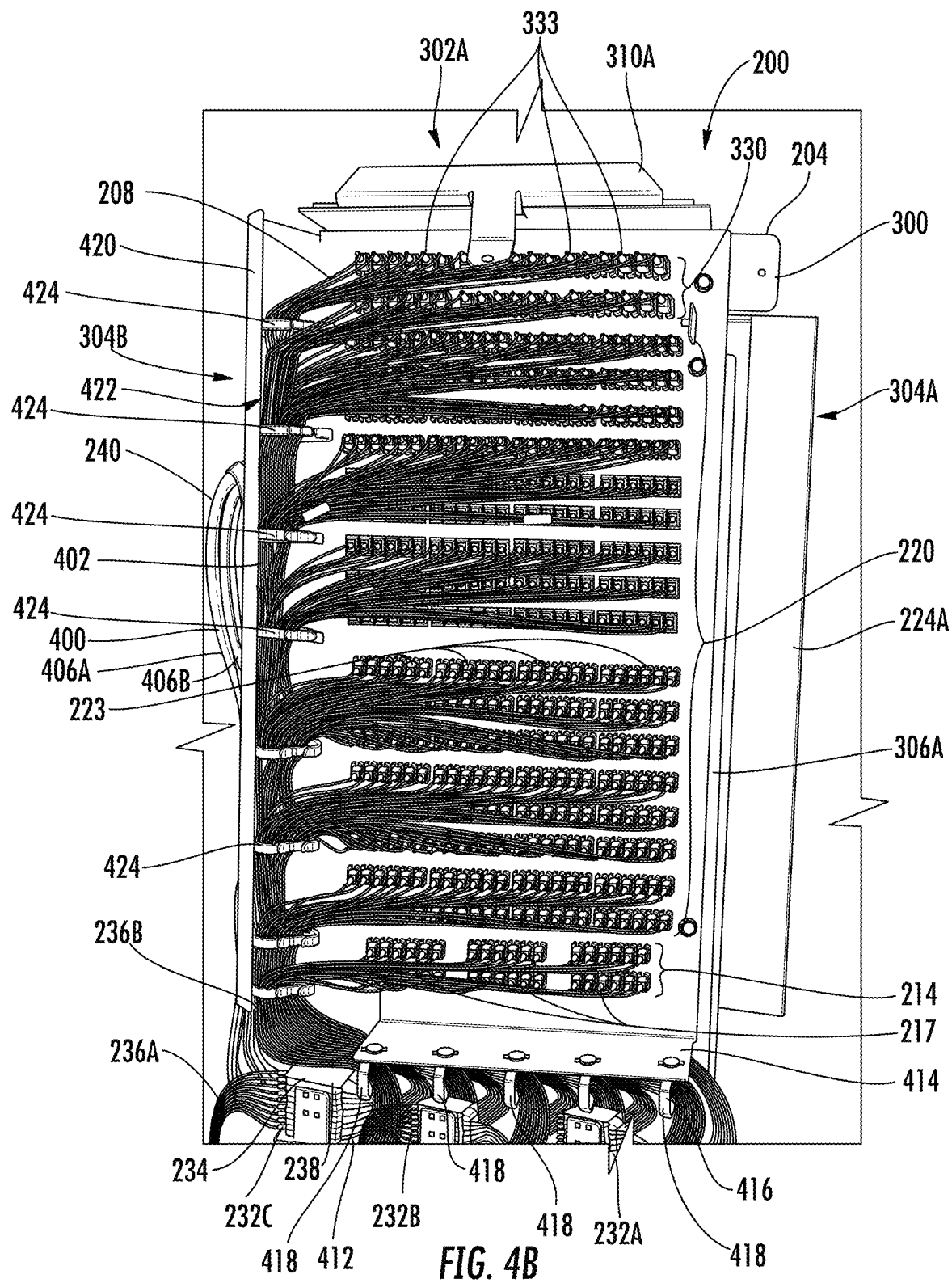
FIG. 4B is an exemplary back perspective view of the fiber optic apparatus of FIG. 4A illustrating back wiring.

FIGS. 4A-4B are exemplary views of the fiber optic apparatus 200 of FIGS. 2-3B illustrating wiring thereof. When installed in a telecommunications cabinet 202, the fiber optic cable assembly 208 of the fiber optic apparatus 200 provides optical communication and fiber optic routing management. In particular, the fiber optic cable assembly 208 includes side wiring 400, back wiring 402, and front wiring 404. Side wiring 400 includes input fibers 406A that may be in optical communication with a network provider (e.g., from a central office) and output fibers 406B that may be in optical communication with a subscriber (e.g., home, business, etc.). The side wiring 400 further includes an armored tail 408 attached to and downwardly extending from the detachable strain relief bracket 242 downwardly to a ground port. The side wiring 400 further includes flexible tubing 240 attached to and upwardly extending from the detachable strain relief bracket 242 to the frame body 204 of the fiber optic apparatus 200. In certain embodiments, the flexible tubing 240 comprises expando mesh or any other flexible material. Accordingly, the side wiring 400 provides optical communication between the fiber optic apparatus 200 and a splice box 410.

The back wiring 402 includes a plurality of RFK sets 232A-232C providing optical communication between the side wiring 400 and the fiber optic connection array 206 (e.g., the feeder port connector adapters 217 of the feeder ports 216, the distribution port connector adapters 223 of the distribution ports 222, and/or the pass-through port connector adapters 333 of the pass-through ports 332). The front wiring 404 includes fiber optic splitter modules 212 and provides optical communication between the feeder port connector adapters 217 of the feeder ports 216 of the feeder panel 214, the distribution port connector adapters 223 of the distribution ports 222 of the distribution panel 220, and/or the pass-through port connector adapters 333 of the pass-through ports 332 of the pass-through panel 330.

The general optical signal (and associated wiring) flows, as an example, from a provider to the splice box 410, and then proceeds from the splice box 410 through input fibers 406A to the back wiring 402, and in particular to the input cables 236A of the RFK sets 232A-232C. The optical signal then proceeds through the output cables 236B of the RFK sets 232A-232C to a backside of the feeder port connector adapters 217 of the feeder ports 216 and/or the pass-through port connector adapters 333 of the pass-through ports 332. The front side of at least some of the feeder port connector adapters 217 of the feeder ports 216 may be connected (e.g., physically connected) to the splitter input connector 230A (see FIG. 5A) of the splitter input cables 218A of at least one of the fiber optic splitter modules 212. The optical signal then proceeds through the fiber optic splitter module 212 to the splitter output cables 218B. At least some of the splitter output connectors 230B (see FIG. 2) of the splitter output cables 218B are connected (e.g., physically connected) to a frontside of the distribution port connector adapters 223 of the distribution ports 222 of the distribution panel 220. A backside of the distribution port connector adapters 223 of the distribution ports 222 of the distribution panel 220 is connected (e.g., physically connected) to at least a portion of the RFK sets 232A-232C which are then connected to the output fibers 406B. The optical signal then flows through the cables in the flexible tubing 240 to the armored tail 408 to the subscriber premises (e.g., home, business, etc.).

The upper body 306A includes a lower back shelf 412 for mounting the plurality of RFK sets 232A-232C, explained in more detail below. The lower back shelf 412 is positioned between the splitter mount 210 and the feeder panel 214. The upper body 306A further includes an upper back shelf 414 for horizontally routing output cables 236B of the RFK sets 232A-232C. The upper back shelf 414 is positioned above the plurality of RFK sets 232A-232C and below the feeder panel 214. Further, the upper back shelf 414 includes a horizontal routing guide 416 embodied as a plurality of routing clips 418. The plurality of routing clips 418 are attached to a lower surface of the upper back shelf 414 and downwardly extending therefrom. The plurality of routing clips 418 retain at least a portion of the output cables 236B of the plurality of RFK sets 232A-232C to route the output cables 236B of the RFK sets 232A-232C toward the right side 304B of the fiber optic apparatus 200.

The upper body 306A of the frame body 204 of the support structure 300 of the fiber optic apparatus 200 also includes a vertical side flange 420 vertically extending along a right side 304B of the frame body 204. The vertical side flange 420 includes a back vertical routing guide 422 embodied as a plurality of routing clips 424 for routing fibers between the RFK sets 232A-232C and the feeder ports 216, distribution ports 222, and/or pass-through ports 332. In particular, the output cables 236B of the RFK sets 232A-232C are routed upwardly along the vertical side flange 420 and then toward the left side 304A to their respective feeder port connector adapter 217 of the feeder port 216, distribution port connector adapter 223 of the distribution port 222, or pass-through port connector adapter 333 of the pass-through port 332.

Figure 5B:
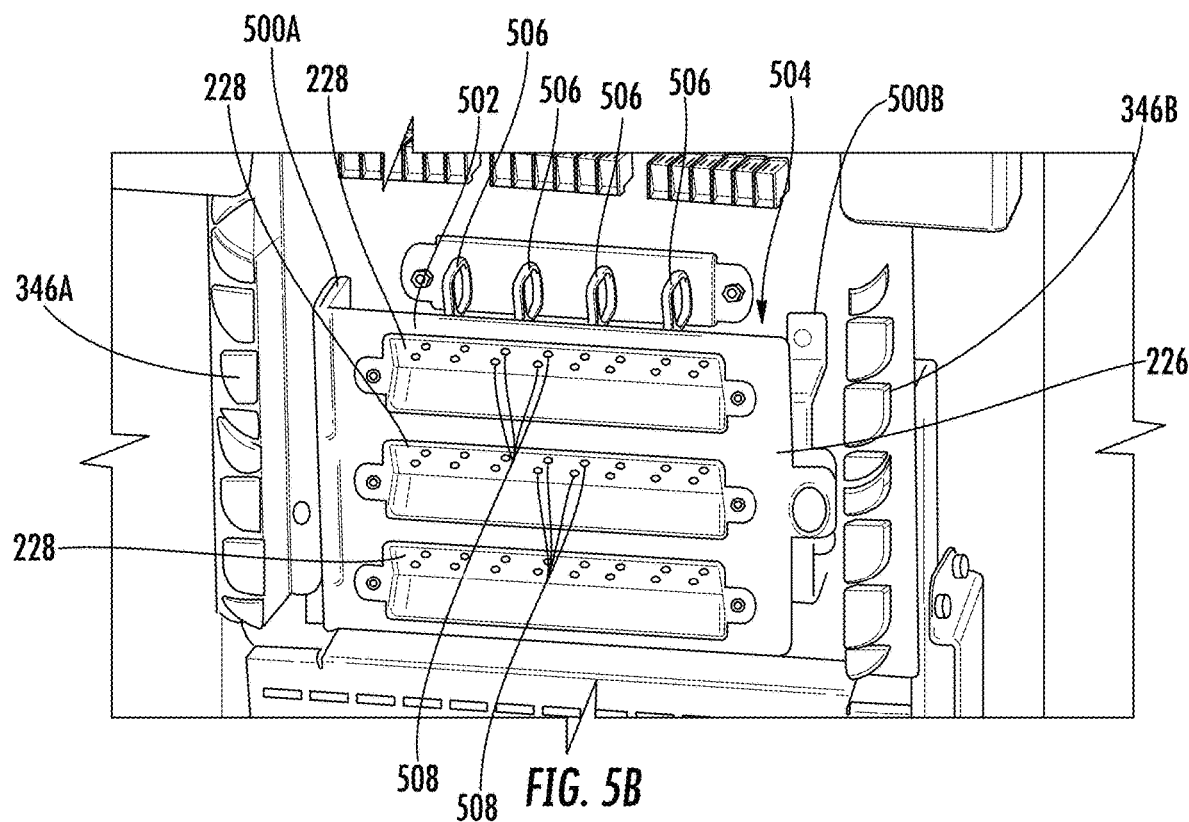
FIG. 5B is an exemplary front view of the connector parking panel of FIG. 5A without the splitter connectors and connector parking blocks mounted thereto.

FIGS. 5A-5B are views of the connector parking panel 226. As mentioned above, the connector parking panel 226 is configured for removably mounting one or more parking blocks 328, which are shown mounted to the connector parking panel 226 in FIG. 5A and are removed from the connector parking panel in FIG. 5B. The connector parking panel 226 includes a left bracket 500A, a right bracket 500B, and a plate 502 extending between the left bracket 500A and the right bracket 500B. In this way, the plate 502 is offset from the frame body 204 and defines a vertical channel 504 therebetween. This arrangement provides clearance for splitter input cables 218A to extend from the fiber optic splitter modules 212 mounted on the splitter mount 210 to the feeder port connector adapters 217 in the feeder ports 216 of the feeder panel 214, as the connector parking panel 226 is positioned between the splitter mount 210 and the feeder panel 214. The plate 502 is hingedly connected along a left side thereof to the left bracket 500A to provide access to the vertical channel 504 behind the plate 502.

The splitter installation 324 further includes a plurality of front routing clips 506 horizontally aligned. The front routing clips 506 are positioned above the connector parking panel 226 and between the connector parking panel 226 and the feeder panel 214. The front routing clips 506 are configured to route the splitter input cables 218A from the fiber optic splitter modules 212 to the feeder panel 214, and/or to retain the unconnected splitter input connectors 230A for easy access for subsequent connection of the splitter input connectors 230A.

The plate 502 of the connector parking panel 226 includes one or more recessed mount surface 228 obliquely angled relative to a front surface of the plate 502. Each recessed mount surface 228 includes a plurality of apertures 508 for mounting the connector parking block 328 thereto. Each connector parking block 328 includes one or more prongs 510 for attaching the connector parking block 328 to the connector parking panel 226. The connector parking block 328 is removably attachable to the connector parking panel 226 by insertion of the prongs 510 of the connector parking block 328 into the apertures 508 of the connector parking panel 226. In this way, the recessed mount surface 228 is obliquely angled so that when the connector parking block 328 is attached to the recessed mount surface 228, the connector parking block 328 and associated splitter input connectors 230A are downwardly angled. This arrangement reduces the depth of the connector parking block 328 and associated splitter input connectors 230A, and accordingly, reduces the depth of the fiber optic apparatus 200.

Figure 6A:
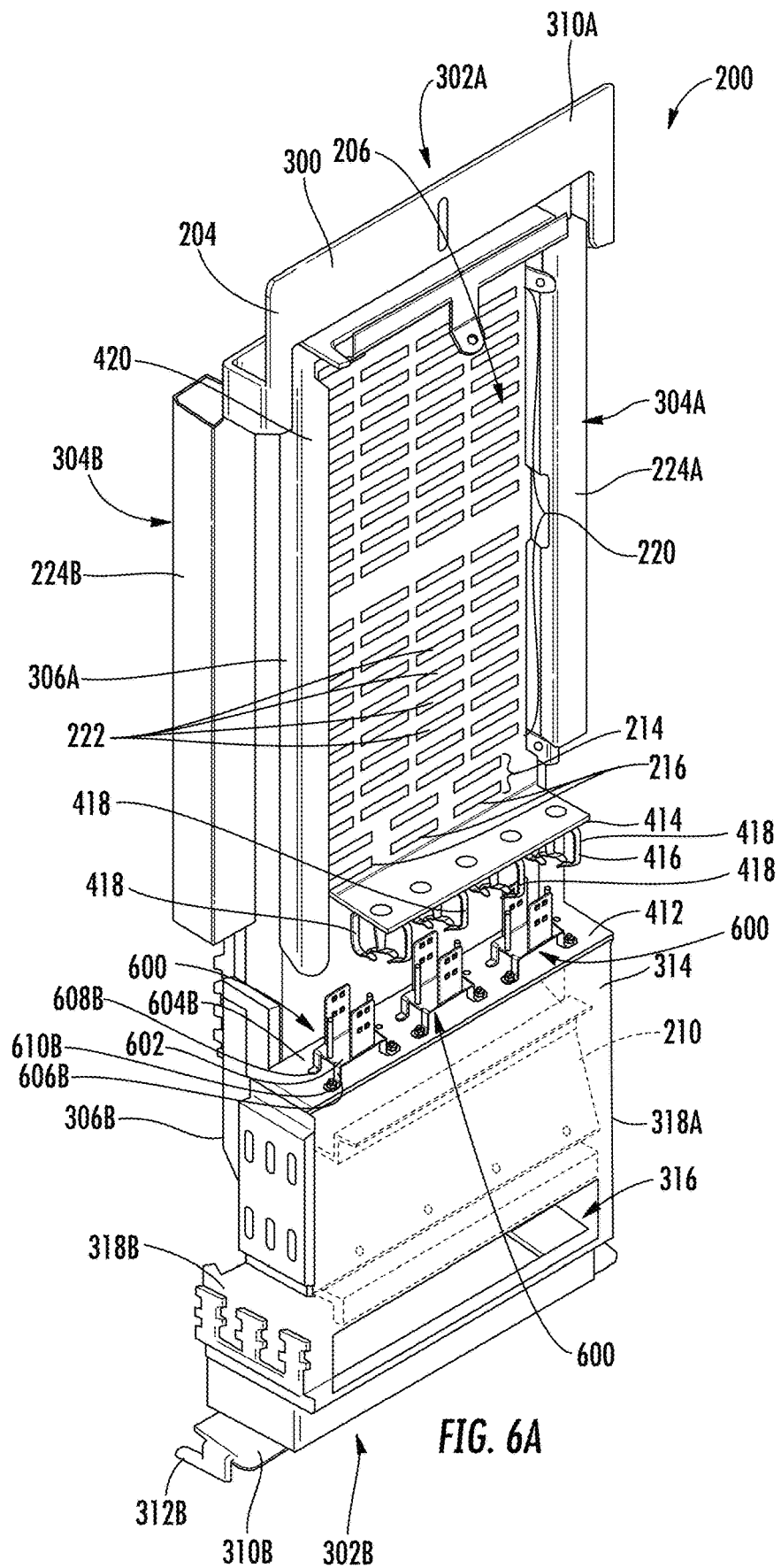
FIG. 6A is an exemplary back perspective view of the fiber optic apparatus of FIGS. 2-5B with a back cover removed and without wiring.
Figure 6B:
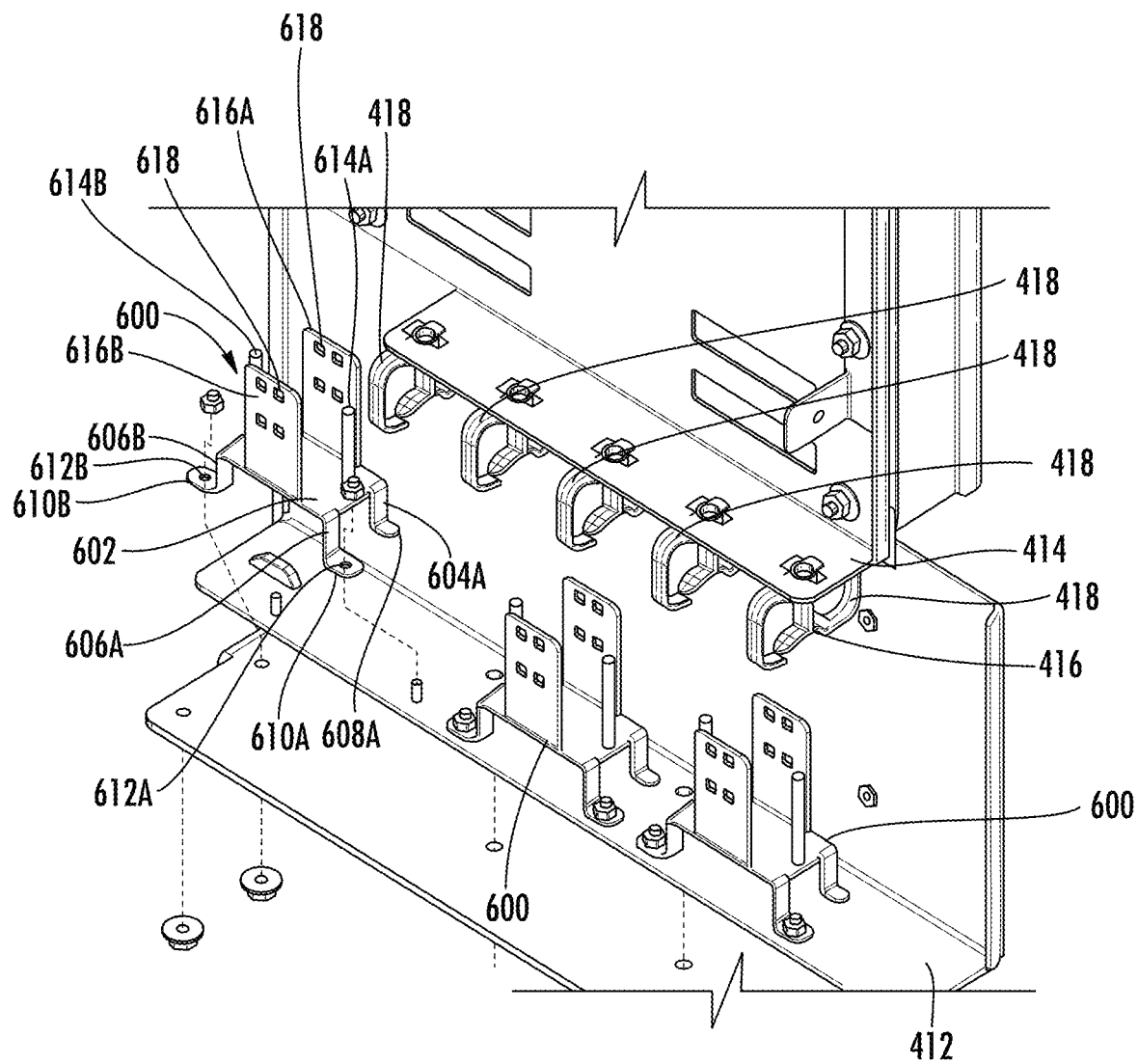
FIG. 6B is an exemplary back perspective view of FIG. 6A illustrating a plurality of RFK mounts.
Figure 6C:
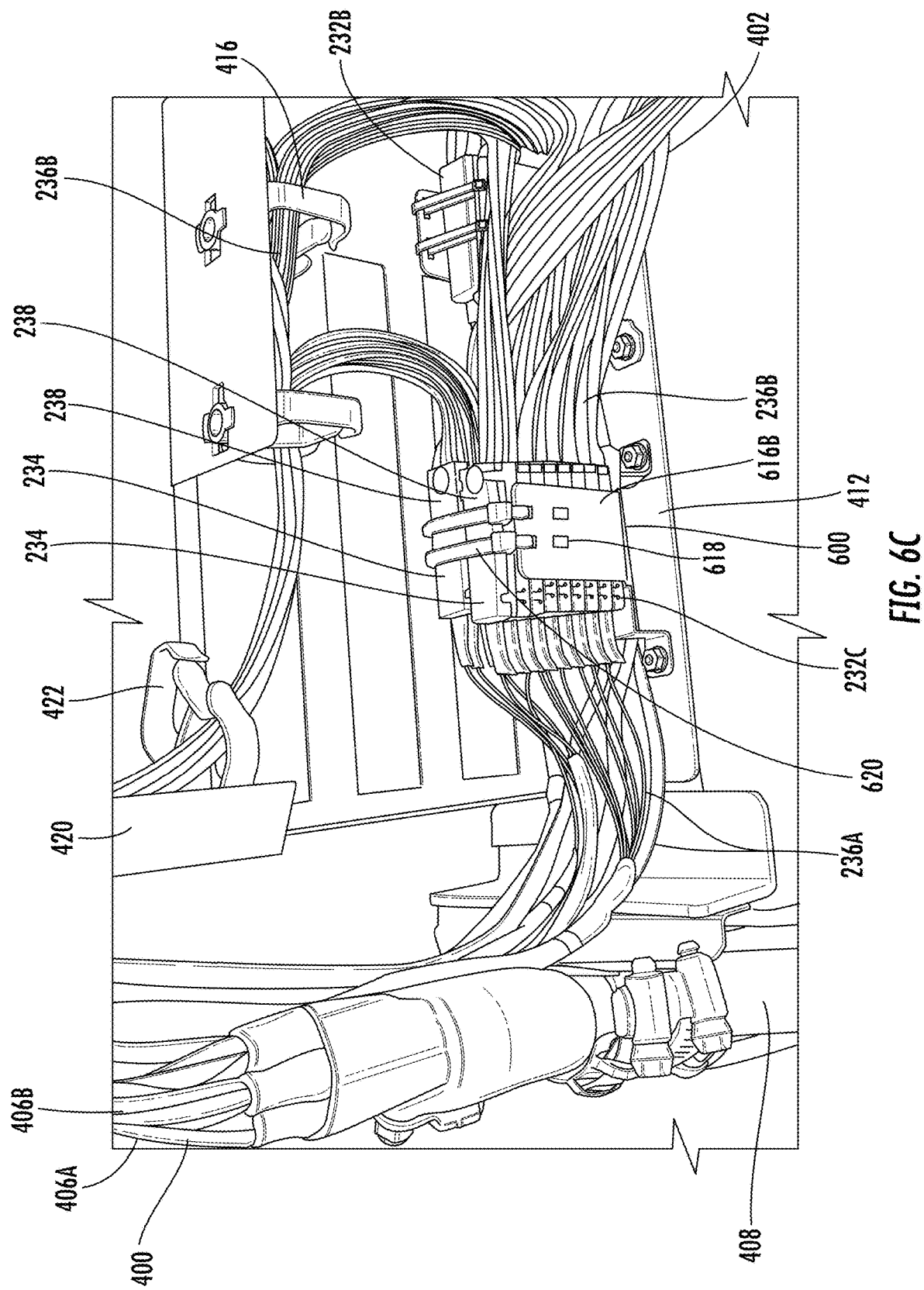
FIG. 6C is an exemplary back perspective view of FIGS. 6A-6B illustrating attachment of RFK sets to the RFK mounts.

FIGS. 6A-6C are views of the fiber optic apparatus 200 of FIGS. 2-5B illustrating mounting of an RFK set 232C to the fiber optic apparatus 200. This mounting methodology also applies to the RFK sets 232A, 232B which are not illustrated. The upper body 306A of the fiber optic apparatus 200 includes a plurality of RFK mounts 600 attached to the lower back shelf 412 of the upper body 306A of the frame body 204 of the support structure 300 of the fiber optic apparatus 200. Each of the plurality of RFK mounts 600 includes a base 602 with a plurality of legs 604A-606B downwardly extending therefrom. The plurality of legs 604A-606B offset the base 602 of the RFK mount 600 from the lower back shelf 412 thereby providing sufficient room for routing of input cable 236A for adjacent RFK sets 232A-232C underneath. In particular, the plurality of legs 604A-606B includes a front left leg 604A downwardly extending at a front left corner of the base 602, a back left leg 606A downwardly extending at a back left corner of the base 602, a front right leg 604B downwardly extending at a front left corner of the base 602, a back right leg 606B downwardly extending at a back left corner of the base 602. Positioning of the plurality of legs 604A-606B at corners of the base 602 provides sufficient room between them (e.g., between the front left leg 604A and the back left leg 606A, between the front right leg 604B and the back right leg 606B) to route the input cable 236A for adjacent RFK sets 232A-232C therebetween. Each of the front left and right legs 604A, 604B comprises a foot 608A, 608B for stability of the RFK mount 600. Each of the back left and right legs 606A, 606B comprises a foot 610A, 610B, each with a hole 612A, 612B in it for mounting the RFK mount 600 to the lower back shelf 412. This arrangement facilitates stability and easy assembly of the RFK mounts 600 to the lower back shelf 412.

The RFK mounts 600 further comprise a left post 614A upwardly extending at a left side of the base 602 and a right post 614B upwardly extending at a right side of the base 602. The left and right posts 614A, 614B horizontally retain the housings 238 of the RFKs 234 on the base 602. The RFK mounts 600 further comprise a front wall 616A upwardly extending at a front side of the base 602 and a back wall upwardly extending at a back side of the base 602. The front and back walls 616A, 616B retain the housings 238 of the RFKs 234 on the base 602. Further, each of the front and back walls 616A, 616B may define a plurality of holes 618 for inserting a fastener (embodied as a cable tie 620) across a top of the front and back walls 616A, 616B, thereby vertically retaining the housings 238 of the RFKs 234 between the front and back walls 616A, 616B. Additionally, the front and back walls 616A, 616B may be configured to mount multiple stacks (also referred to as columns) of housings 238 of RFKs 234.

FIG. 7 is a partial side view of the fiber optic apparatus 200 of FIGS. 2-6C illustrating a detachable strain relief bracket 242 (but omitting side wiring 400). The detachable strain relief bracket 242 includes a body 700 with a flange 702 downwardly extending from the body 700. The flange 702 includes a plurality of holes 704 for receiving a fastener (embodied as a screw) therein for mounting the detachable strain relief bracket 242 to the right sidewall 318B. The detachable strain relief bracket 242 further includes a plurality of prongs 706 upwardly extending from the body 700. Each of the plurality of prongs 706 includes one or more left nubs 708A extending from a left side of the prong 706 and one or more right nubs 708B extending from a right side of the prong 706. The prongs 706 provide a surface for fastening the armored tail 408 and flexible tubing 240 to the detachable strain relief bracket 242, such as by cable ties (explained in more detail below). The left and right nubs 708A, 708B prevent the cable ties from slipping upward or downward on the prong 706 (discussed in more detail below).

Figure 8A:
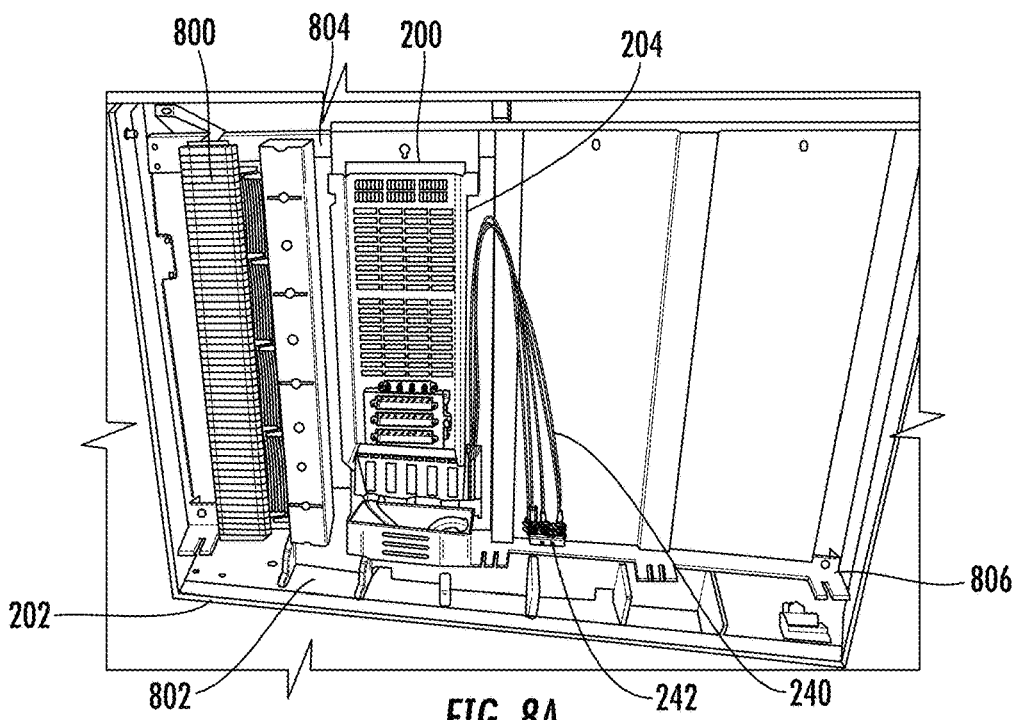
FIG. 8A is an exemplary perspective view of the fiber optic apparatus of FIGS. 2-7 mounted within the telecommunications cabinet of FIG. 2.
Figure 8B:
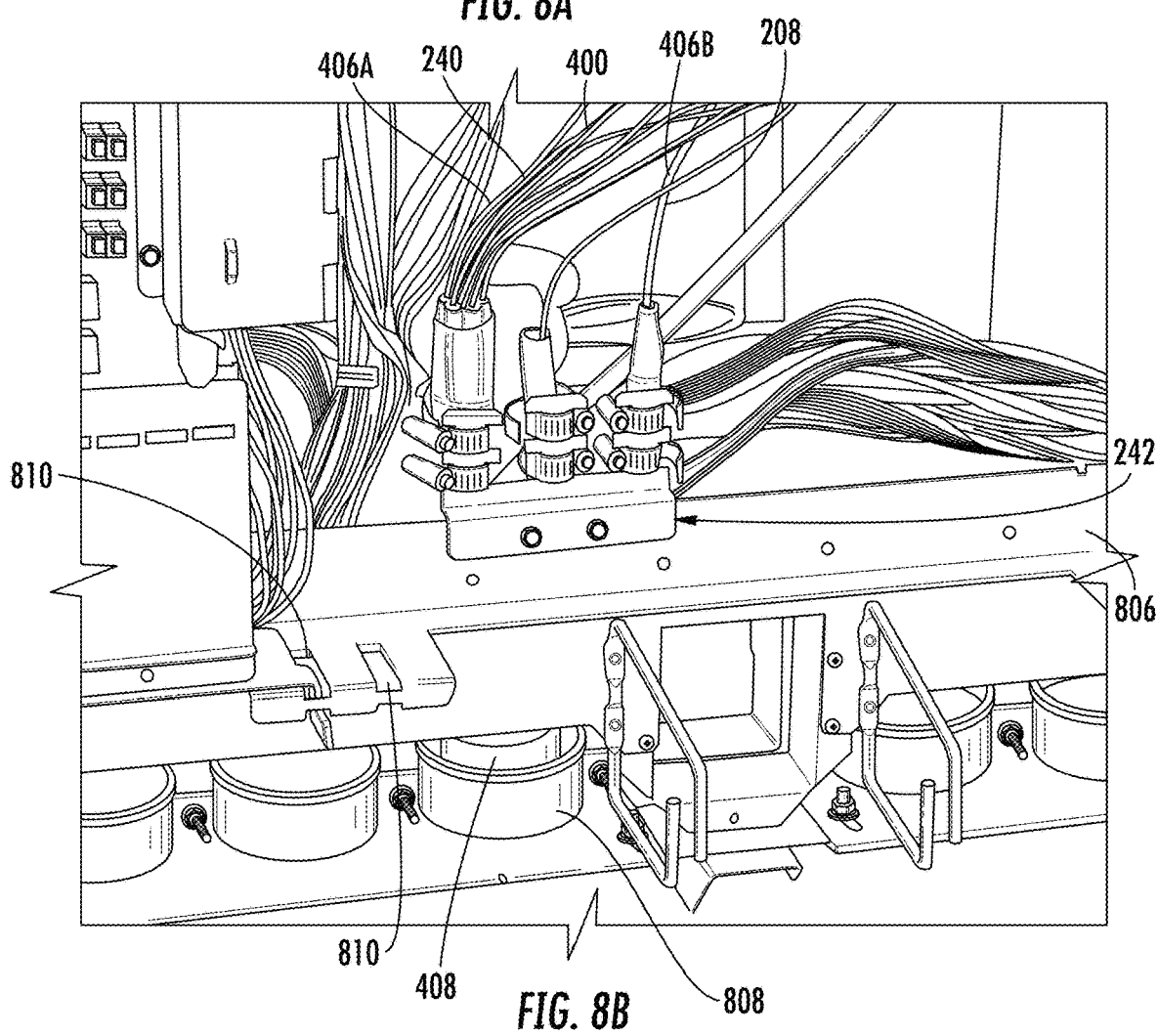
FIG. 8B is an exemplary perspective view of the fiber optic apparatus of FIG. 8A illustrating the detachable strain relief bracket detached from the fiber optic apparatus and attached to the telecommunications cabinet.

FIG. 8A is a view of the fiber optic apparatus 200 of FIGS. 2-7 mounted within a telecommunications cabinet 202 of FIG. 2. The telecommunications cabinet 202 is attached to a secured surface 802. The telecommunications cabinet 202 includes electrical copper wiring components 800 and the fiber optic apparatus 200 mounted between a top rail 804 and a bottom rail 806 of the telecommunications cabinet 202. The telecommunications cabinet 202 is positioned over a distribution cable conduit 808 (as illustrated in FIG. 8B). In some embodiments, the detachable strain relief bracket 242 may initially be coupled to the frame body 204 for shipment and may then be removed from the frame body 204 for installation onto the bottom rail 806.

FIG. 8B is a magnified view of the strain relief bracket 242 coupled to the bottom rail 806. When the strain relief bracket 242 is coupled to the bottom rail 806, the strain relief bracket 242 is positioned over the distribution cable conduit 808 such that the armored tail 408 is inserted into the distribution cable conduit 808. This arrangement provides an installer with flexibility in retrofitting the fiber optic apparatus 200 within the telecommunications cabinet 202, as there may be some offset between mountable locations of the fiber optic apparatus 200 on the telecommunications cabinet 202 and the location of the distribution cable conduit 808 relative to those mountable locations. Thus, the detachable strain relief bracket 242 may be mounted to the left or right side of the fiber optic apparatus 200 when mounted within the telecommunications cabinet 202. An embodiment in which the detachable strain relief bracket 242 is mounted to the right side of the fiber optic apparatus 200 is illustrated in FIG. 8A.

Figure 8C:
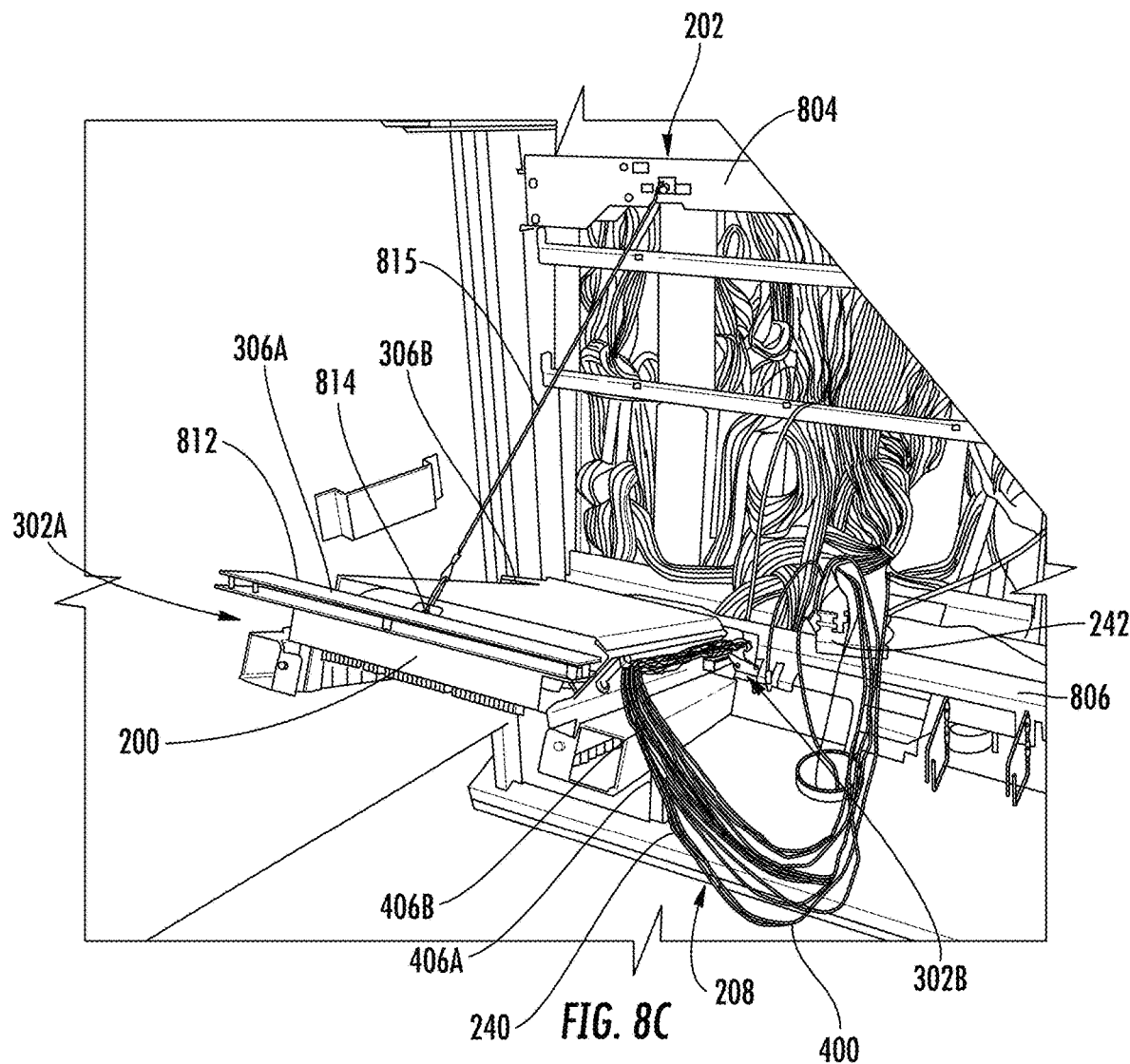
FIG. 8C is an exemplary perspective view of the fiber optic apparatus of FIGS. 8A-8B illustrating the fiber optic apparatus in a pivoted open position.

Referring momentarily to FIG. 3A, as noted above the bottom installation bracket 310B includes left and right hooks 312A, 312B. Referring again to FIG. 8B, these left and right hooks 312A, 312B may be inserted into slots 810 in the bottom rail 806 and retained therein. Accordingly, when the top installation bracket 310A is unsecured from the top rail 804 of the telecommunications cabinet 202, the fiber optic apparatus 200 is forwardly pivotable to provide access to the area of the telecommunications cabinet 202 directly behind the fiber optic apparatus 200, as shown in FIG. 8C. Referring now to FIG. 8C, the upper body 306A of the fiber optic apparatus 200 may include a support bracket 812 including a tab 814 at a back thereof attached to the top installation bracket 310A. A cable 815 may be attached between the top rail 804 and the tab 814 such that the operator may release the fiber optic apparatus 200 in the open position without the fiber optic apparatus 200 touching the ground. Further, the elongated length of the flexible tubing 240 (see FIG. 2) allows for the fiber optic apparatus 200 to pivot forward, even when the detachable strain relief bracket 242 is mounted to the bottom rail 806.

Figure 9A:
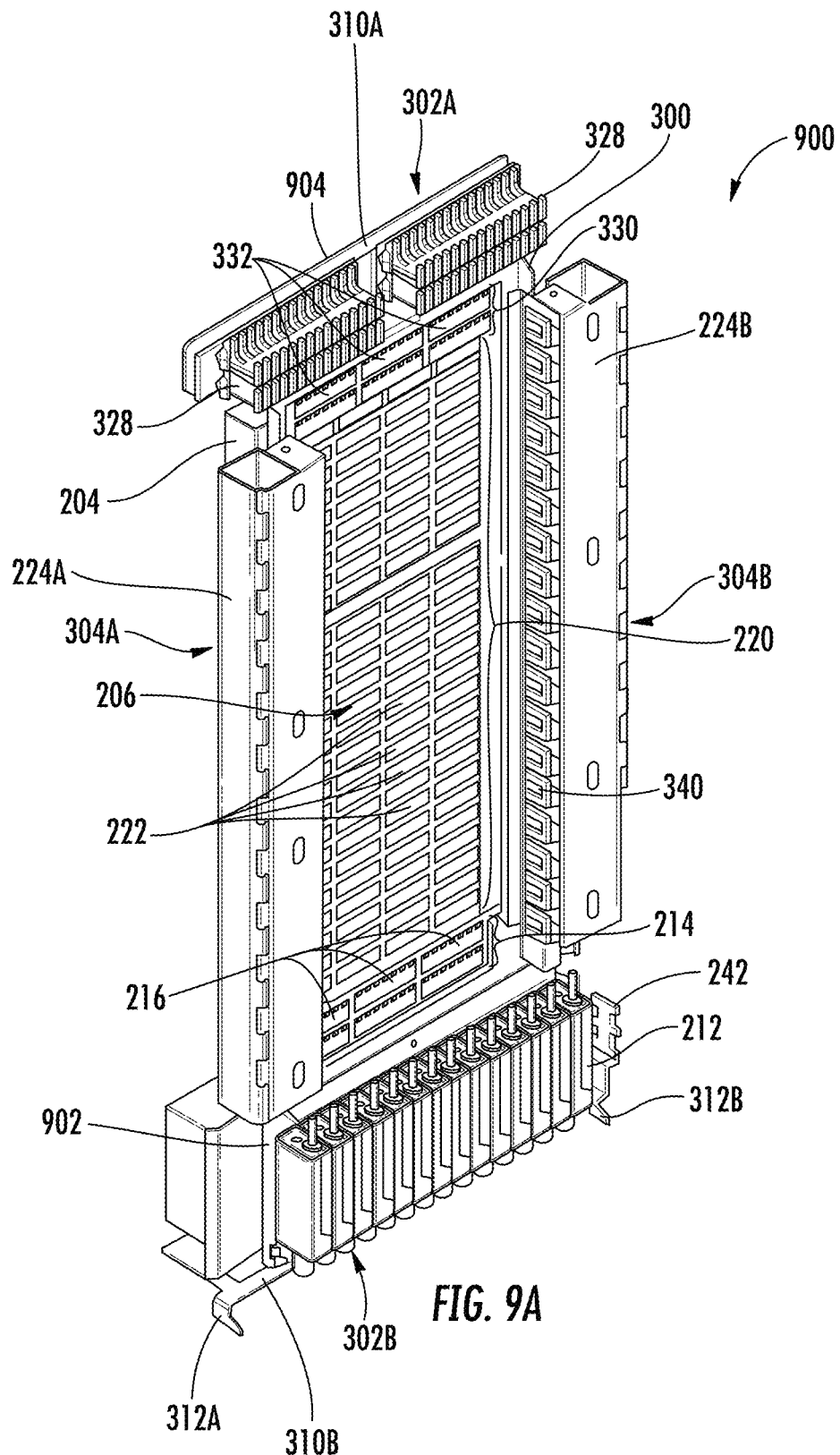
FIG. 9A is an exemplary front perspective view of another embodiment of the fiber optic apparatus of FIGS. 2-8C.
Figure 9B:
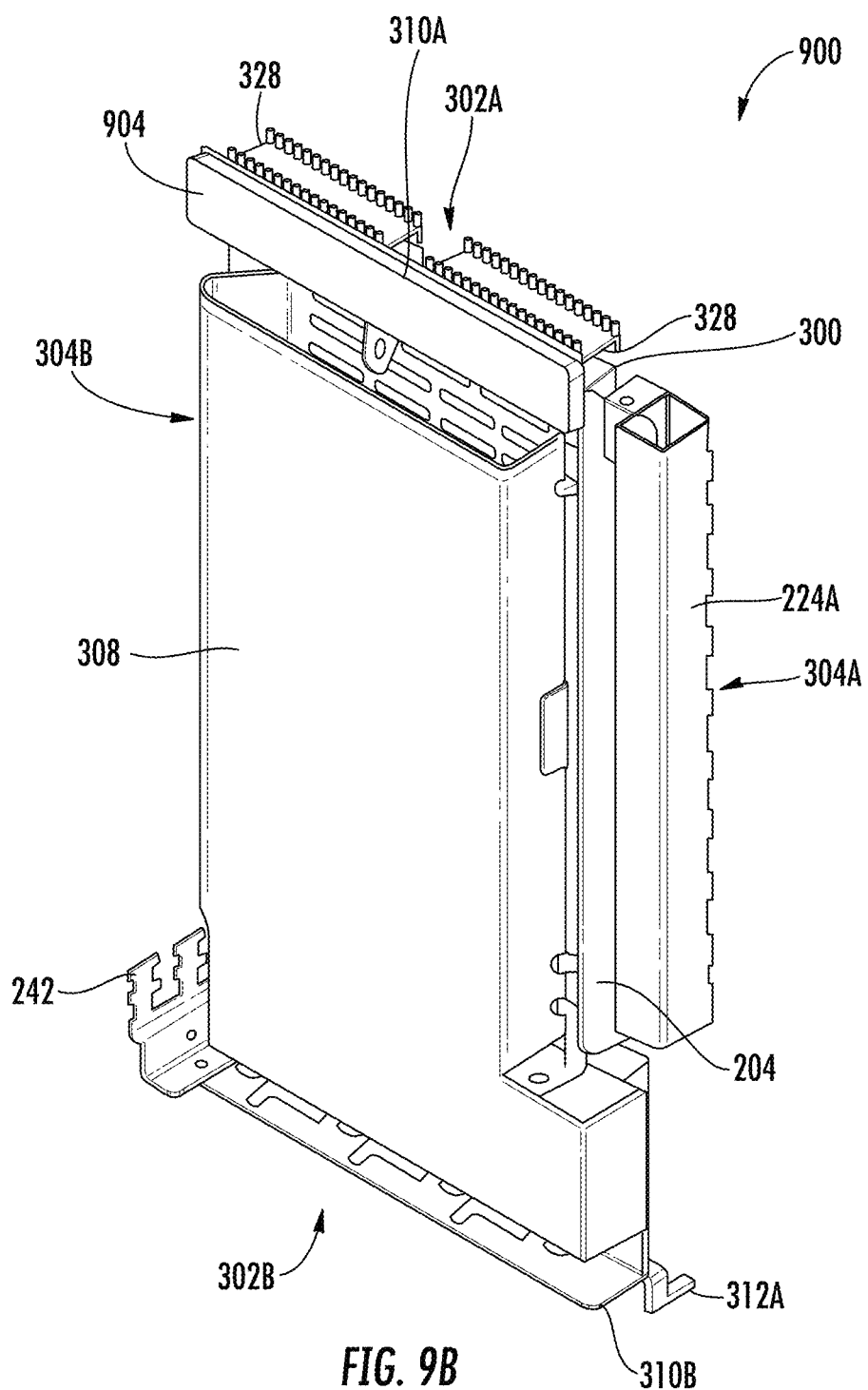
FIG. 9B is an exemplary back perspective view of the fiber optic apparatus of FIG. 9A.
Figure 9C:
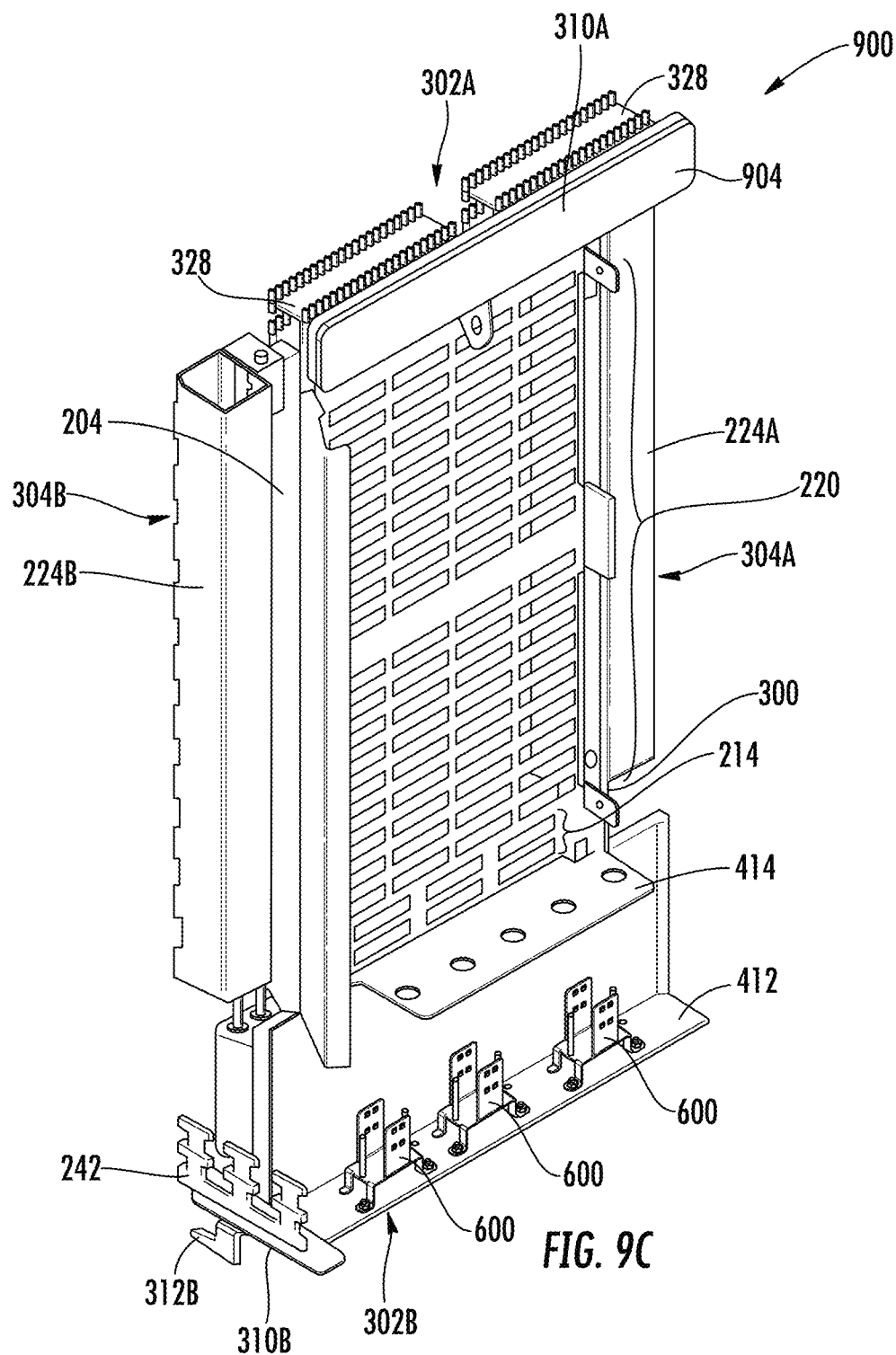
FIG. 9C is an exemplary back perspective view of the fiber optic apparatus of FIG. 9A with a back cover removed.

FIGS. 9A-9C are exemplary views of another embodiment of the fiber optic apparatus 200 of FIGS. 2-8C. The fiber optic apparatus 900 includes all the same features as those described above for the fiber optic apparatus 200, except where otherwise noted. The fiber optic apparatus 900 is configured to have a lower profile (also referred to as a decreased height) compared to the fiber optic apparatus 200 of FIGS. 2-8C, such as between 25 and 35 inches. In some embodiments, the fiber optic apparatus 900 may provide for fewer distribution ports 222 and therefore fewer distribution port connector adapters 223 (see, e.g., FIG. 4A). For example, in some embodiments, the fiber optic apparatus 900 may include capacity for up to 288 fiber optic adapters.

In particular, the fiber optic apparatus 900 includes a splitter mount 902, but the splitter mount 902 is not angled, and the fiber optic apparatus 900 does not include a bottom container 322. Further, a connector parking panel 904 is positioned at a top of the fiber optic apparatus 900 above the pass-through panel 330. Further, the connector parking panel 904 does not include a recessed mounting surface, and the parking blocks 328 are mounted perpendicularly to the connector parking panel 904. Although the recessed mounting surface could be used, it is not needed because the connector parking panel 904 is not forwardly offset from the frame body 204 as in the fiber optic apparatus of FIGS. 2-8C.

Figure 10:
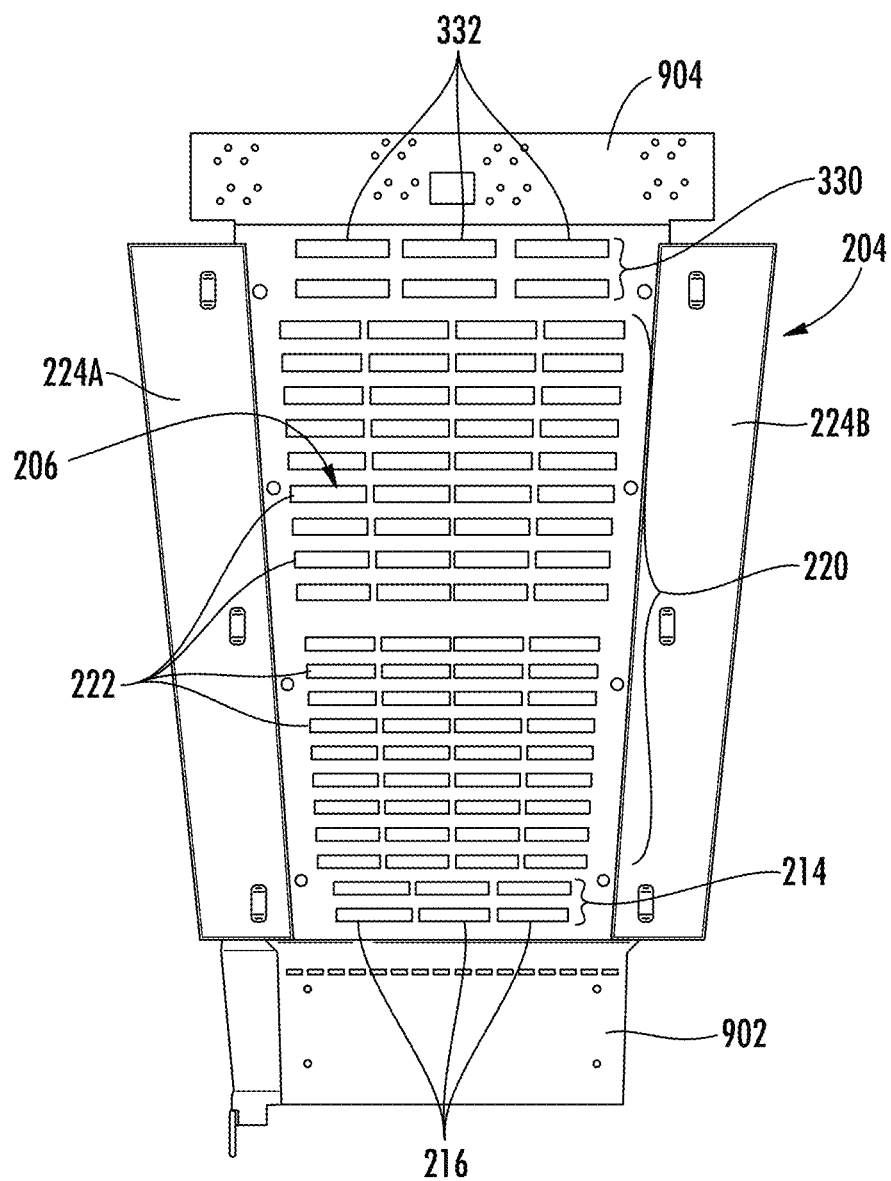
FIG. 10 is an exemplary front view of a frame body and a fiber optic connection array of the fiber optic apparatus of FIGS. 9A-9C.
Figure 11:
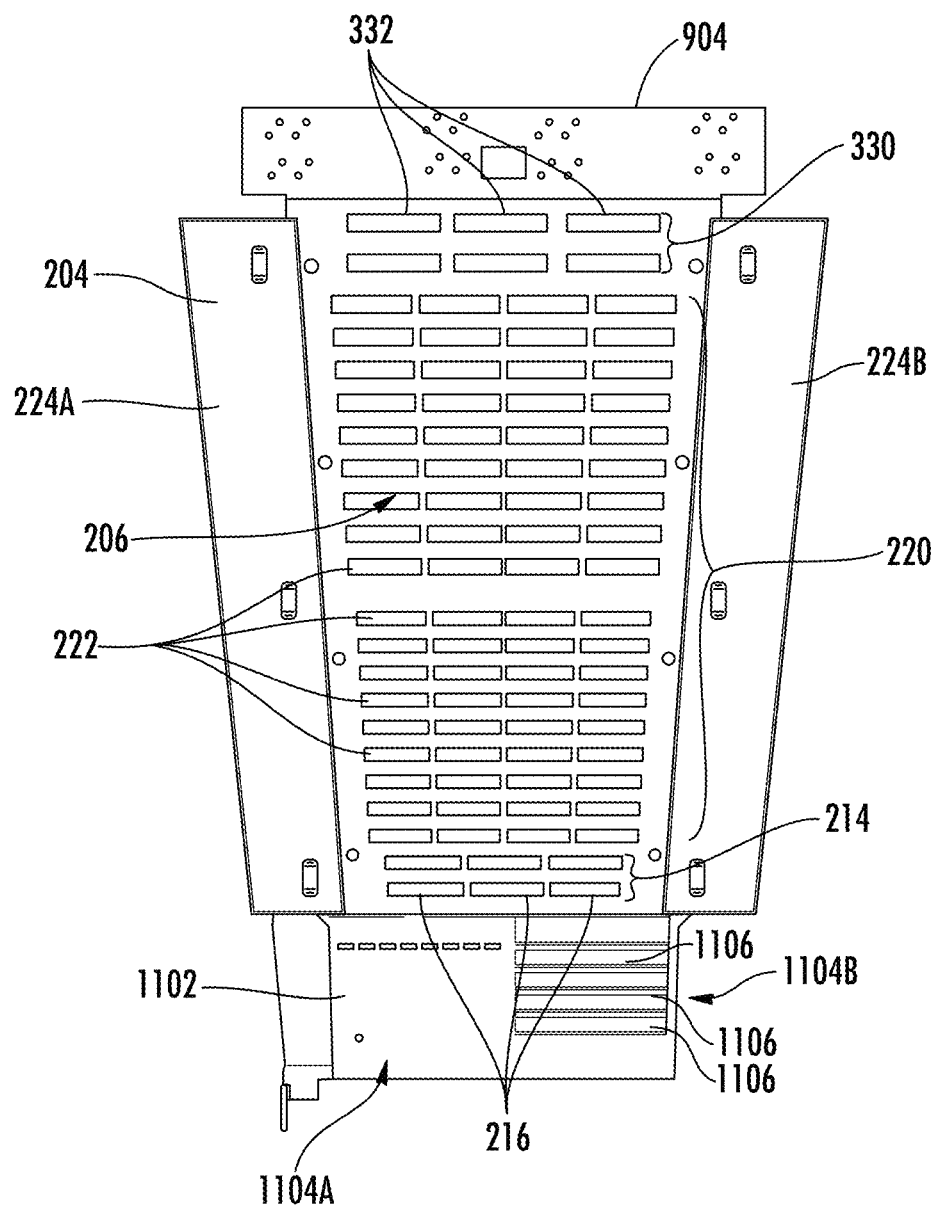
FIG. 11 is an exemplary front view of another embodiment of a frame body and fiber optic connection array of the fiber optic apparatus of FIGS. 9A-9C.

FIG. 10 is an exemplary front view of a frame body and fiber optic connection array of the fiber optic apparatus of FIGS. 9A-9C. In particular the splitter mount 902 is configured for mounting a plurality of LS splitters. FIG. 11 is an exemplary front view of another embodiment of a frame body and fiber optic connection array of the fiber optic apparatus of FIGS. 9A-9C. In this embodiment, the splitter mount 1102 includes a left section 1104A configured for mounting slim splitters, and a right section 1104B with three parking block slots 1106 each configured for mounting a connector parking block 328 (see FIG. 5A).

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A fiber optic apparatus, comprising:
a frame having a first end, a second end, a first side extending between the first end and the second end, and a second side extending between the first end and the second end, wherein the frame is configured for placement in a telecommunications cabinet with the second end oriented toward a surface on which the telecommunications cabinet is secured and the first end oriented away from the surface on which the telecommunications cabinet is secured;
a distribution panel attached to the frame and comprising a plurality of distribution port connector adapters; and
a fiber optic cable assembly in optical communication with the plurality of distribution port connector adapters, the fiber optic cable assembly comprising:
a first ribbon fan-out kit (RFK) set positioned between the second end and the distribution panel, the first RFK set comprising a plurality of RFKs; and
a second RFK set positioned between the second end and the distribution panel and further positioned between the second side of the frame and the first RFK set, the second RFK set comprising a plurality of RFKs;
wherein each of the plurality of RFKs of the first and second RFK sets comprises:
a housing;
at least one input cable; and
a plurality of output cables;

wherein at least a plurality of the housings of the first RFK set are stacked along a direction between the first end and the second end of the frame; and wherein at least a portion of the at least one input cable of the first RFK set is positioned between the second end of the frame and the housings of the second RFK set, wherein the telecommunication cabinet is configured to house copper electronic equipment and the fiber optic apparatus is configured for retrofit fiber optic connectivity.

2. The fiber optic apparatus of claim 1, wherein the at least a plurality of the housings of the first RFK set are stacked in a plurality of columns along the direction between the first end and the second end of the frame.

3. The fiber optic apparatus of claim 1, further comprising a third RFK set comprising a plurality of RFKs, the third RFK set positioned between the second end and the distribution panel and between the second side and the second RFK set, wherein at least a portion of the at least one input cable of the second RFK set is positioned between the second end of the frame and the housings of the third RFK set.

4. The fiber optic apparatus of claim 1, further comprising an RFK mount for mounting the second RFK set to the frame, the RFK mount comprising a base and a plurality of legs extending from the base.

5. The fiber optic apparatus of claim 4, wherein the housings of the second RFK set are positioned between the plurality of legs of the RFK mount.

* * * * *